United States Patent
Christensen et al.

(10) Patent No.: US 10,871,140 B1
(45) Date of Patent: Dec. 22, 2020

(54) SYSTEMS AND METHODS FOR REDUCING ENGINE TORQUE UTILIZING SPLIT LAMBDA FUELING

(71) Applicant: Ford Global Technologies, LLC, Dearborn, MI (US)

(72) Inventors: Michael Scott Christensen, Canton, MI (US); Aakash Puntambekar, Canton, MI (US); Douglas Raymond Martin, Canton, MI (US); Adam Joseph Krach, Canton, MI (US); John Eric Rollinger, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/657,823

(22) Filed: Oct. 18, 2019

(51) Int. Cl.
*F02P 5/04* (2006.01)
*F02D 41/00* (2006.01)
*F02D 37/02* (2006.01)

(52) U.S. Cl.
CPC .............. *F02P 5/045* (2013.01); *F02D 37/02* (2013.01); *F02D 41/0082* (2013.01)

(58) Field of Classification Search
CPC ....... F02P 5/045; F02D 41/0082; F02D 37/02
USPC .......... 123/406.23, 436, 673, 676, 691, 692; 701/103, 110, 111
See application file for complete search history.

(56) References Cited

U.S. PATENT DOCUMENTS

| | | | |
|---|---|---|---|
| 4,951,773 A | 8/1990 | Poirier et al. | |
| 7,069,910 B2* | 7/2006 | Surnilla | ............... F01N 3/0814 123/198 DB |
| 7,356,988 B2 | 4/2008 | Pott et al. | |
| 7,975,471 B2 | 7/2011 | Miyashita | |
| 8,112,218 B2 | 2/2012 | Russ | |
| 8,838,365 B2 | 9/2014 | Glugla et al. | |
| 10,174,699 B2 | 1/2019 | Suzuki et al. | |

* cited by examiner

*Primary Examiner* — Hai H Huynh
(74) *Attorney, Agent, or Firm* — Geoffrey Brumbaugh; McCoy Russell LLP

(57) ABSTRACT

Methods and systems are provided for cycle-to-cycle torque reductions under exhaust component temperature constraints. In one example, a method may include, responsive to a torque reduction request, introducing a lambda split between two sets of cylinders over a plurality of engine cycles while maintaining an average of stoichiometry between the two sets of cylinders, and, responsive to reaching a lambda split threshold, introducing differentially delayed ignition timing in both sets of cylinders. In this way, fast torque reduction may be provided while maintaining a globally stoichiometric air-fuel ratio, thereby decreasing vehicle emissions, and reducing heat-related degradation to exhaust components.

20 Claims, 6 Drawing Sheets

SYSTEMS AND METHODS FOR REDUCING ENGINE TORQUE UTILIZING SPLIT LAMBDA FUELING

FIELD

The present description relates generally to methods and systems for reducing engine torque via air-fuel ratio and ignition timing adjustments.

BACKGROUND/SUMMARY

An internal combustion engine combusts an air/fuel mixture within cylinders to produce torque, which may be used to propel a vehicle. During vehicle operation, an engine controller regulates the amount of torque produced by the engine by controlling various operating parameters, including amounts of air and fuel provided to the cylinders and a timing of a spark produced by a spark plug to initiate combustion. A torque reduction may be requested due to a gear shift event or responsive to a driver tip-out event, among other torque reduction conditions. The controller may retard spark timing, throttle airflow, and/or cut fuel in response to the torque reduction request. Frequently, retarded spark timing (also referred to herein as "spark retard") is used to quickly reduce the amount of torque produced by the engine while maintaining the amount of fuel and air provided to the cylinders, whereas throttling airflow may be used when a slower response is sufficient. However, spark retard increases an exhaust gas temperature due to late energy release, for example. In some examples, such a temperature increase may degrade exhaust system components. Further, spark retard reduces combustion efficiency, thereby decreasing vehicle fuel economy.

One example approach for reducing engine torque without increasing the exhaust gas temperature is shown by Poirier et al. in U.S. Pat. No. 4,951,773 A. Therein, a number of engine cylinders are excluded from fuel supply to reduce the engine torque while a remaining number of fueled cylinders are enleaned to reduce an amount of unburnt hydrocarbons being discharged into the exhaust from the fueled cylinders. By excluding some cylinders from fuel supply and enleaning the remaining fueled cylinders, torque reductions may be achieved while reducing temperature increases at a downstream catalyst that may result from a reaction between air from the unfueled cylinders and unburnt fuel from the fueled cylinders.

However, the inventors herein have recognized potential issues with such systems. As one example, fuel cut methods may increase vehicle emissions. For example, a spark ignition engine may employ an emission control device that has maximal activity when the engine is operated with a stoichiometric air-fuel ratio (AFR), where it is supplied with just enough fuel to react with an amount of air consumed by the engine. By not providing fuel to one or more cylinders, unreacted air may flow to the emission control device, which may increase vehicle emissions.

In one example, the issues described above may be addressed by a method, comprising: responsive to a torque reduction request while an exhaust temperature is greater than a threshold, operating an engine with a first number of cylinders enriched and a second number of cylinders enleaned, exhaust gas from both the first number and the second number producing a stoichiometric air-fuel ratio at a downstream catalyst, and then adjusting spark timing in the first number of cylinders before adjusting spark timing in the second number of cylinders. In this way, engine torque reductions may be achieved through a strategy of globally stoichiometric AFR adjustments combined with spark retard, without increasing vehicle emissions or exhaust gas temperature relative to stoichiometric operation.

As one example, operating the engine with the first number of cylinders enriched and the second number of cylinders enleaned may include determining a maximum air-fuel ratio difference between a first, rich air-fuel ratio for operating the first number of cylinders enriched and a second, lean air-fuel ratio for the second number of cylinders enleaned. Further, the first number of cylinders may be enriched and the second number of cylinders may be enleaned over one or more engine cycles until the maximum air-fuel ratio difference is reached. As a further example, the stoichiometric air-fuel ratio may be maintained at the downstream catalyst each of the one or more engine cycles, even as the rich air-fuel ratio of the first number of cylinders and the lean air-fuel ratio of the second number of cylinders changes each engine cycle. By operating the first number of cylinders enriched and the second number of cylinders enleaned, overall engine torque may be reduced compared with operating the first number of cylinders and the second number of cylinders at stoichiometry, while stoichiometric exhaust gas is maintained at the catalyst for increased catalyst efficiency.

As another example, adjusting the spark timing in the first number of cylinders before adjusting spark timing in the second number of cylinders may include retarding a first spark timing in the first number of cylinders while maintaining a second spark timing in the second number of cylinders until a balanced torque output between the first number of cylinders and the second number of cylinders is achieved. For example, prior to adjusting the spark timing in the first number of cylinders, the torque output of the second number of cylinders may be less than the torque output of the first number of cylinders. Therefore, by retarding the spark timing in the first number of cylinders while maintaining the spark timing in the second number of cylinders, the torque output of the first number of cylinders may be decreased to the torque output of the second number of cylinders, which also further decreases the overall engine torque output. As still another example, responsive to the balanced torque output being achieved, the first spark timing may be further retarded while the second spark timing is also retarded to a lesser degree, thus maintaining the balanced torque output while further reducing the overall engine torque until the torque reduction request is met.

In this way, engine torque may be decreased while an efficiency of the downstream catalyst is maintained, thereby decreasing vehicle emissions compared with fuel cut strategies, and exhaust temperatures may be reduced compared with decreasing engine torque via spark retard alone. For example, a bulk exhaust gas temperature may decrease with increasing torque reduction achieved by operating the number of cylinders enriched and the second number of cylinders enleaned while maintaining an average exhaust gas air-fuel ratio at stoichiometry, which is an opposite effect to retarding spark timing at stoichiometric fueling. By reducing the bulk exhaust temperature, heat-related degradation of exhaust system components, including the catalyst, may be decreased.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
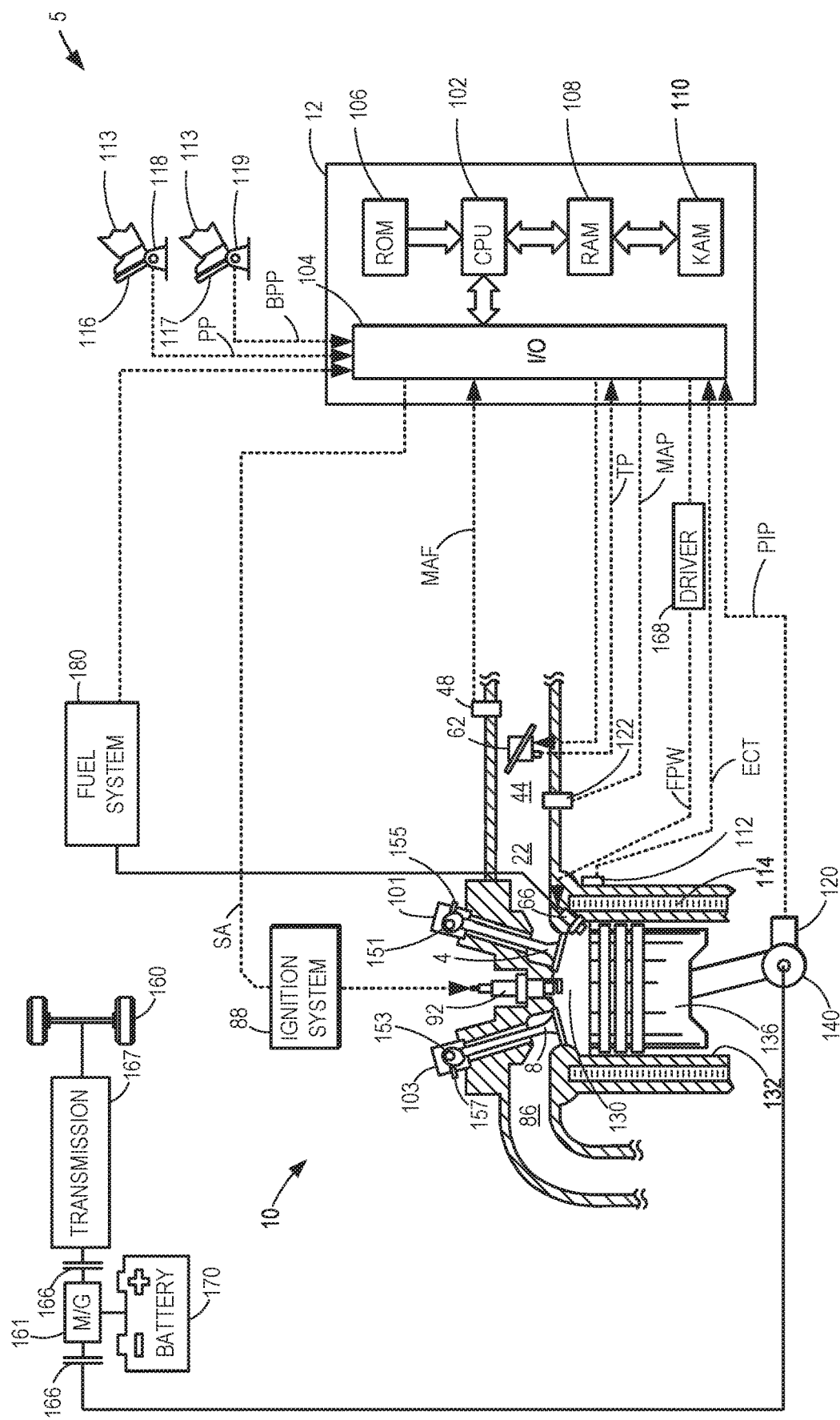
FIG. 1 shows an embodiment of a cylinder that may be included in an engine system.
Figure 2:
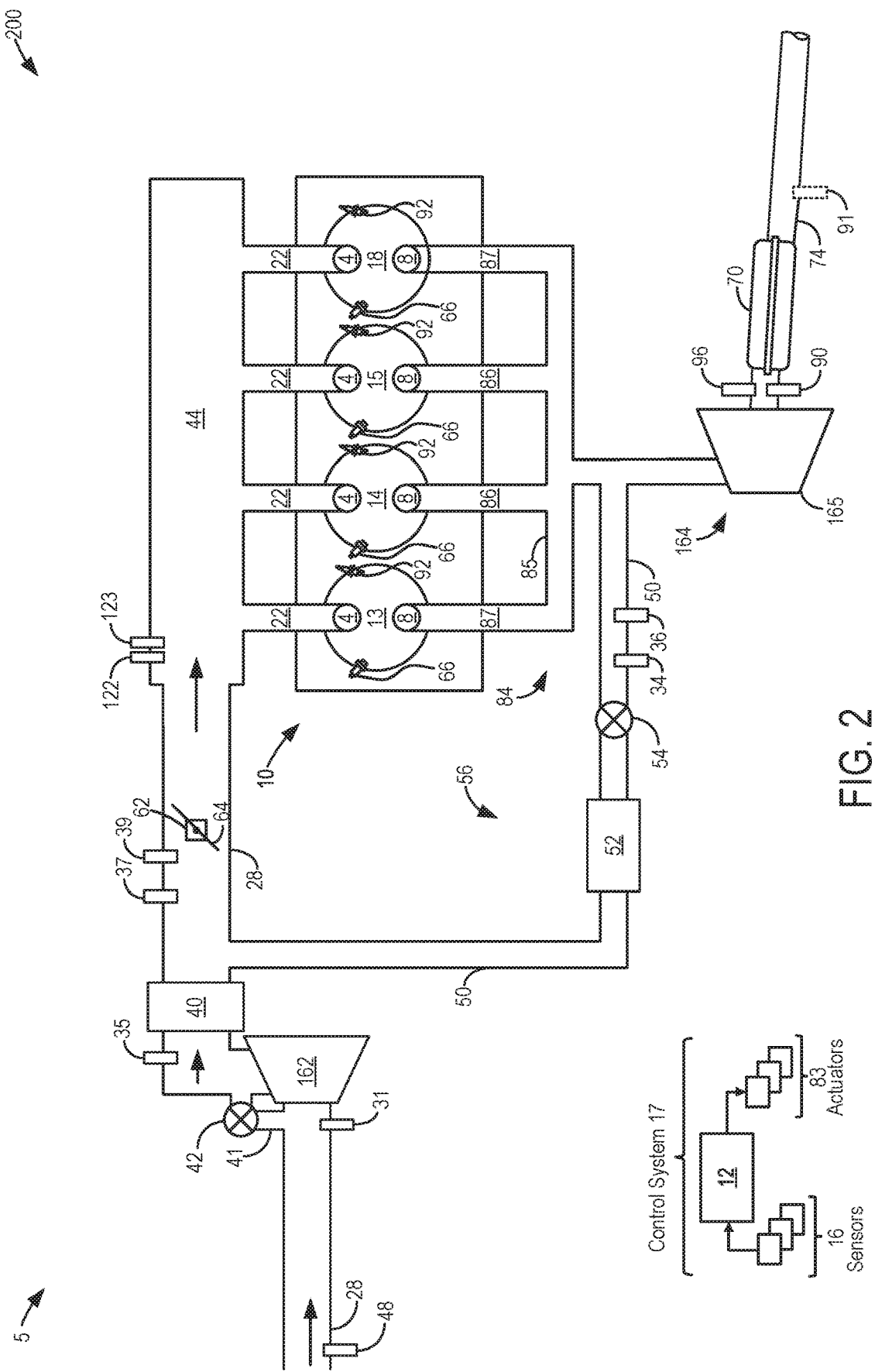
FIG. 2 shows a schematic depiction of a first example of an engine system.
Figure 3:
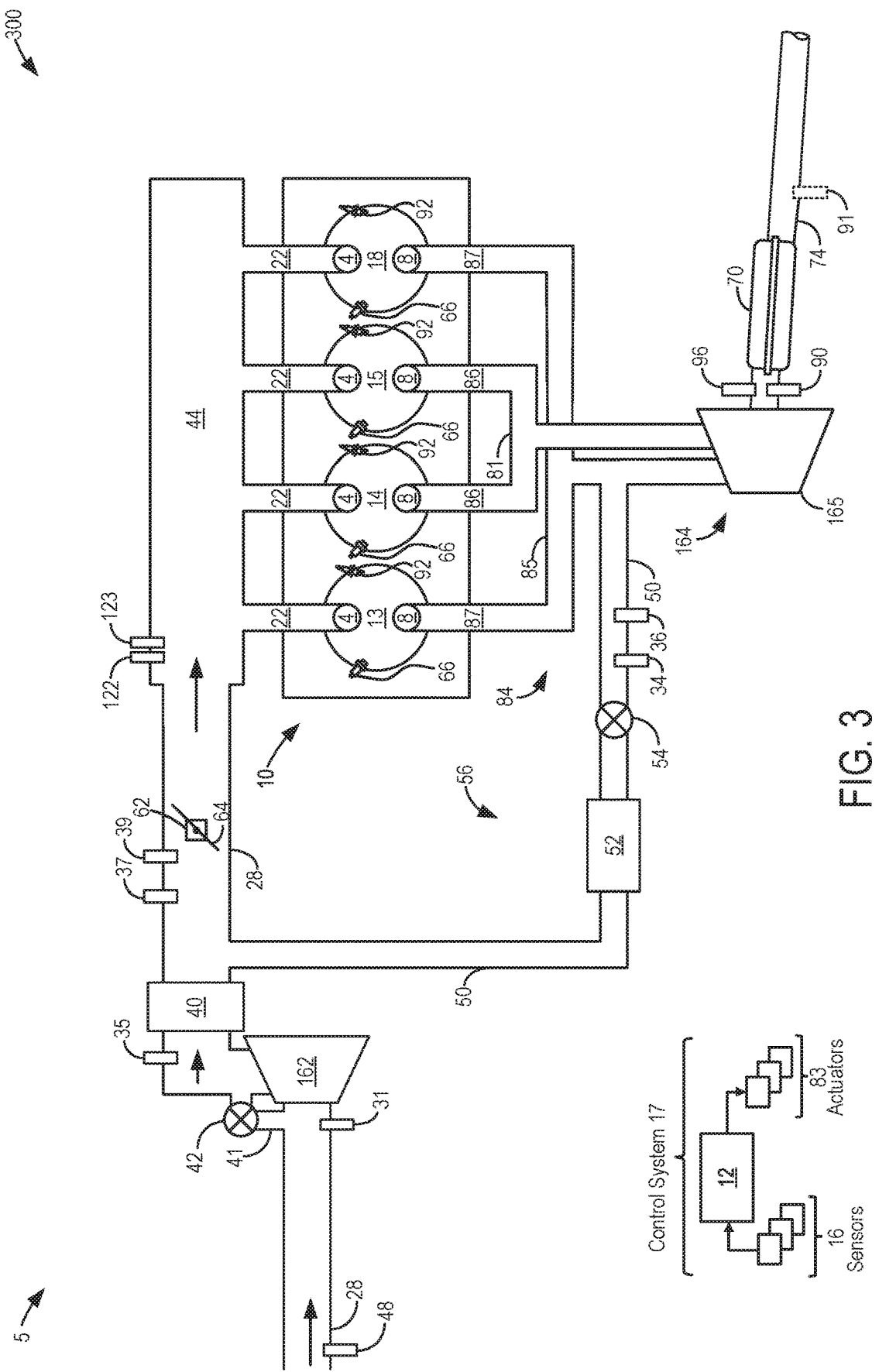
FIG. 3 shows a schematic depiction of a second example of an engine system.

The following description relates to systems and methods for fast torque reduction via a split lambda fueling strategy in combination with spark retard, referred to herein as a split lambda torque reduction mode. As will be elaborated herein, the split lambda fueling strategy includes operating a first subset of engine cylinders with a rich air-fuel ratio (e.g., lambda value) and a second subset of the engine cylinders with a lean air-fuel ratio while maintaining stoichiometry at a downstream catalyst. The engine may include various multi-cylinder configurations, such as the example engine system configurations shown in FIGS. 2 and 3, and each cylinder of the engine may have a cylinder configuration, such as shown in FIG. 1. In particular, FIG. 2 shows an inline-4 configuration with a single exhaust manifold, and FIG. 3 shows an inline-4 configuration that includes two separate exhaust manifolds. The engine may employ the split lambda torque reduction mode due to a relationship between air-fuel ratio and engine torque output, such as the example relationship illustrated in FIG. 4. For example, lean air-fuel ratios may reduce engine torque output compared with rich air-fuel ratios or stoichiometry, enabling overall torque reductions by splitting the engine cylinders between rich and lean fueling. A controller may transition the engine into and out of operating in the split lambda torque reduction mode via the example method of FIG. 5. A prophetic example timeline illustrating transitioning between the stoichiometric mode and the split lambda torque reduction mode, including adjustments made to cylinder air-fuel ratio splits and cylinder spark timing, based on engine torque reduction requests is shown in FIG. 6. In this way, fast reductions in torque may be obtained without increasing vehicle emissions or degrading exhaust components via temperature increases.

Turning now to the figures, FIG. 1 shows a partial view of a single cylinder 130 of an internal combustion engine 10 that may be included in a vehicle 5. Internal combustion engine 10 may be a multi-cylinder engine, and different engine system configurations for engine 10 will be described below with respect to FIGS. 2-4. Cylinder (e.g., combustion chamber) 130 includes a coolant sleeve 114 and cylinder walls 132, with a piston 136 positioned therein and connected to a crankshaft 140. Combustion chamber 130 is shown communicating with an intake manifold 44 via an intake valve 4 and an intake port 22 and with an exhaust port 86 via exhaust valve 8.

In the depicted view, intake valve 4 and exhaust valve 8 are located at an upper region of combustion chamber 130. Intake valve 4 and exhaust valve 8 may be controlled by a controller 12 using respective cam actuation systems including one or more cams. The cam actuation systems may utilize one or more of cam profile switching (CPS), variable cam timing (VCT), variable valve timing (VVT), and/or variable valve lift (VVL) systems to vary valve operation. In the depicted example, intake valve 4 is controlled by an intake cam 151, and exhaust valve 8 is controlled by an exhaust cam 153. The intake cam 151 may be actuated via an intake valve timing actuator 101 and the exhaust cam 153 may be actuated via an exhaust valve timing actuator 103 according to set intake and exhaust valve timings, respectively. In some examples, the intake valves and exhaust valves may be deactivated via the intake valve timing actuator 101 and exhaust valve timing actuator 103, respectively. For example, the controller may send a signal to the exhaust valve timing actuator 103 to deactivate exhaust valve 8 such that it remains closed and does not open at its set timing. The position of intake cam 151 and exhaust cam 153 may be determined by camshaft position sensors 155 and 157, respectively.

In some examples, the intake and/or exhaust valve may be controlled by electric valve actuation. For example, cylinder 130 may alternatively include an intake valve controlled via electric valve actuation and an exhaust valve controlled via cam actuation, including CPS and/or VCT systems. In still other examples, the intake and exhaust valves may be controlled by a common valve actuator or actuation system or a variable valve timing actuator or actuation system.

Cylinder 130 can have a compression ratio, which is a ratio of volumes when piston 136 is at bottom dead center to top dead center. Conventionally, the compression ratio is in a range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include a spark plug 92 for initiating combustion. An ignition system 88 can provide an ignition spark to combustion chamber 130 via spark plug 92 in response to a spark advance signal SA from controller 12, under select operating modes. A timing of signal SA may be adjusted based on engine operating conditions and a driver torque demand. For example, spark may be provided at maximum brake torque (MBT) timing to maximize engine power and efficiency. Controller 12 may input engine operating conditions, including engine speed, engine load, and exhaust gas air-fuel ratio, into a look-up table, which may output the corresponding MBT timing for the input engine operating conditions. In other examples, spark may be retarded from MBT to prevent an occurrence of knock. In still other examples, spark may be retarded from MBT to rapidly reduce engine torque, such as due to a decrease in driver-demanded torque or a transmission gear shift event, as further described below with respect to FIG. 5.

As a non-limiting example, cylinder 130 is shown including one fuel injector 66. Fuel injector 66 is shown coupled directly to combustion chamber 130 for injecting fuel directly therein in proportion to a pulse-width of a signal FPW received from controller 12 via an electronic driver 168. In this manner, fuel injector 66 provides what is known as direct injection (hereafter also referred to as "DI") of fuel into cylinder 130. While FIG. 1 shows injector 66 as a side injector, it may also be located overhead of the piston, such as near the position of spark plug 92. Such a position may increase mixing and combustion when operating the engine with an alcohol-based fuel due to the lower volatility of some alcohol-based fuels. Alternatively, the injector may be located overhead and near the intake valve to increase mixing. In another example, injector 66 may be a port injector providing fuel into the intake port upstream of cylinder 130.

Fuel may be delivered to fuel injector 66 from a high pressure fuel system 180 including one or more fuel tanks, fuel pumps, and a fuel rail. Alternatively, fuel may be delivered by a single stage fuel pump at a lower pressure. Further, while not shown, the fuel tanks may include a pressure transducer providing a signal to controller 12. Fuel tanks in fuel system 180 may hold fuel with different fuel qualities, such as different fuel compositions. These differences may include different alcohol content, different octane, different heats of vaporization, different fuel blends, and/or combinations thereof, etc. In some examples, fuel system 180 may be coupled to a fuel vapor recovery system including a canister for storing refueling and diurnal fuel vapors. The fuel vapors may be purged from the canister to the engine cylinders during engine operation when purge conditions are met.

Engine 10 may be controlled at least partially by controller 12 and by input from a vehicle operator 113 via an accelerator pedal 116 and an accelerator pedal position sensor 118 and via a brake pedal 117 and a brake pedal position sensor 119. The accelerator pedal position sensor 118 may send a pedal position signal (PP) to controller 12 corresponding to a position of accelerator pedal 116, and the brake pedal position sensor 119 may send a brake pedal position (BPP) signal to controller 12 corresponding to a position of brake pedal 117. Controller 12 is shown in FIG. 1 as a microcomputer, including a microprocessor unit 102, input/output ports 104, an electronic storage medium for executable programs and calibration values shown as a read only memory 106 in this particular example, random access memory 108, keep alive memory 110, and a data bus. Storage medium read-only memory 106 can be programmed with computer readable data representing instructions executable by microprocessor 102 for performing the methods and routines described herein as well as other variants that are anticipated but not specifically listed. Controller 12 may receive various signals from sensors coupled to engine 10, in addition to those signals previously discussed, including a measurement of inducted mass air flow (MAF) from mass air flow sensor 48, an engine coolant temperature signal (ECT) from a temperature sensor 112 coupled to coolant sleeve 114, a profile ignition pickup signal (PIP) from a Hall effect sensor 120 (or other type) coupled to crankshaft 140, a throttle position (TP) from a throttle position sensor coupled to a throttle 62, and an absolute manifold pressure signal (MAP) from a MAP sensor 122 coupled to intake manifold 44. An engine speed signal, RPM, may be generated by controller 12 from signal PIP. The manifold pressure signal MAP from the manifold pressure sensor may be used to provide an indication of vacuum or pressure in the intake manifold.

Based on input from one or more of the above-mentioned sensors, controller 12 may adjust one or more actuators, such as fuel injector 66, throttle 62, spark plug 92, the intake/exhaust valves and cams, etc. The controller may receive input data from the various sensors, process the input data, and trigger the actuators in response to the processed input data based on instruction or code programmed therein corresponding to one or more routines, an example of which is described with respect to FIG. 5.

In some examples, vehicle 5 may be a hybrid vehicle with multiple sources of torque available to one or more vehicle wheels 160. In other examples, vehicle 5 is a conventional vehicle with only an engine. In the example shown in FIG. 1, the vehicle includes engine 10 and an electric machine 161. Electric machine 161 may be a motor or a motor/generator and thus may also be referred to herein as an electric motor. Electric machine 161 receives electrical power from a traction battery 170 to provide torque to vehicle wheels 160. Electric machine 161 may also be operated as a generator to provide electrical power to charge battery 170, for example, during a braking operation.

Crankshaft 140 of engine 10 and electric machine 161 are connected via a transmission 167 to vehicle wheels 160 when one or more clutches 166 are engaged. In the depicted example, a first clutch 166 is provided between crankshaft 140 and electric machine 161, and a second clutch 166 is provided between electric machine 161 and transmission 167. Controller 12 may send a signal to an actuator of each clutch 166 to engage or disengage the clutch, so as to connect or disconnect crankshaft 140 from electric machine 161 and the components connected thereto, and/or connect or disconnect electric machine 161 from transmission 167 and the components connected thereto. Transmission 167 may be a gearbox, a planetary gear system, or another type of transmission. The powertrain may be configured in various manners including as a parallel, a series, or a series-parallel hybrid vehicle.

As mentioned above, FIG. 1 shows only one cylinder of multi-cylinder engine 10. Referring now to FIG. 2, a schematic diagram of a first example engine system 200 is shown, which may be included in the propulsion system of vehicle 5 of FIG. 1. For example, engine system 200 provides a first example engine configuration of engine 10 introduced in FIG. 1. As such, components previously introduced in FIG. 1 are represented with the same reference numbers and are not re-introduced. In the example shown in FIG. 2, engine 10 includes cylinders 13, 14, 15, and 18, arranged in an inline-4 configuration, although other engine configurations are also possible (e.g., I-3, V-4, I-6, V-8, V-12, opposed 4, and other engine types). Thus, the number of cylinders and the arrangement of the cylinders may be changed without parting from the scope of this disclosure. The engine cylinders may be capped on the top by a cylinder head. Cylinders 14 and 15 are referred to herein as the inner (or inside) cylinders, and cylinders 13 and 18 are referred to herein as the outer (or outside) cylinders. The cylinders shown in FIG. 2 may each have a cylinder configuration, such as the cylinder configuration described above with respect to FIG. 1.

Each of cylinders 13, 14, 15, and 18 includes at least one intake valve 4 and at least one exhaust valve 8. The intake and exhaust valves may be referred to herein as cylinder intake valves and cylinder exhaust valves, respectively. As explained above with reference to FIG. 1, a timing (e.g., opening timing, closing timing, opening duration, etc.) of each intake valve 4 and each exhaust valve 8 may be controlled via various valve timing systems.

Each cylinder receives intake air (or a mixture of intake air and recirculated exhaust gas, as will be elaborated below)

from intake manifold 44 via an air intake passage 28. Intake manifold 44 is coupled to the cylinders via intake ports (e.g., runners) 22. In this way, each cylinder intake port can selectively communicate with the cylinder it is coupled to via a corresponding intake valve 4. Each intake port may supply air, recirculated exhaust gas, and/or fuel to the cylinder it is coupled to for combustion.

As described above with respect to FIG. 1, a high pressure fuel system may be used to generate fuel pressures at the fuel injector 66 coupled to each cylinder. For example, controller 12 may inject fuel into each cylinder at a different timing such that fuel is delivered to each cylinder at an appropriate time in an engine cycle. As used herein, "engine cycle" refers to a period during which each engine cylinder fires once in a designated cylinder firing order. A distributorless ignition system may provide an ignition spark to cylinders 13, 14, 15, and 18 via the corresponding spark plug 92 in response to the signal SA from controller 12 to initiate combustion. A timing of the ignition spark may be individually optimized for each cylinder, as will be further described below with respect to FIG. 5.

Inside cylinders 14 and 15 are each coupled to an exhaust port (e.g., runner) 86 and outside cylinders 13 and 18 are each coupled to an exhaust port 87 for channeling combustion exhaust gases to an exhaust system 84. Each exhaust port 86 and 87 can selectively communicate with the cylinder it is coupled to via the corresponding exhaust valve 8. Specifically, as shown in FIG. 2, cylinders 14 and 15 channel exhaust gases to an exhaust manifold 85 via exhaust ports 86, and cylinders 13 and 18 channel exhaust gases to the exhaust manifold 85 via exhaust ports 87. Thus, engine system 200 includes a single exhaust manifold that is coupled to every cylinder of the engine.

Engine system 200 further includes a turbocharger 164, including a turbine 165 and an intake compressor 162 coupled on a common shaft (not shown). In the example shown in FIG. 2, turbine 165 is a monoscroll turbine. In another example, engine 10 may include a twin scroll (or dual volute) turbine, as will be further described below with respect to FIG. 3. The twin scroll configuration may provide greater power to the turbine wheel compared with the monoscroll configuration by providing a minimum volume (e.g., exhaust gas from two cylinders and a smaller manifold volume) from a given combustion event. In contrast, the monoscroll configuration enables use of lower cost turbines that have higher temperature tolerances.

Rotation of turbine 165 drives rotation of compressor 162, disposed within intake passage 28. As such, the intake air becomes boosted (e.g., pressurized) at the compressor 162 and travels downstream to intake manifold 44. Exhaust gases exit turbine 165 into an exhaust passage 74. In some examples, a wastegate may be coupled across turbine 165 (not shown). Specifically, a wastegate valve may be included in a bypass coupled between an inlet of turbine 165 and exhaust passage 74, downstream of an outlet of turbine 165. The wastegate valve may control an amount of exhaust gas flowing through the bypass and to the outlet of turbine. For example, as an opening of the wastegate valve increases, an amount of exhaust gas flowing through the bypass and not through turbine 165 may increase, thereby decreasing an amount of power available for driving turbine 165 and compressor 162. As another example, as the opening of the wastegate valve decreases, the amount of exhaust gas flowing through the bypass decreases, thereby increasing the amount of power available for driving turbine 165 and compressor 162. In this way, a position of the wastegate valve may control an amount of boost provided by turbocharger 164. In other examples, turbine 165 may be a variable geometry turbine (VGT) including adjustable vanes to change an effective aspect ratio of turbine 165 as engine operating conditions change to provide a desired boost pressure. Thus, increasing the speed of turbocharger 164, such as by further closing the wastegate valve or adjusting turbine vanes, may increase the amount of boost provided, and decreasing the speed of turbocharger 164, such as by further opening the wastegate valve or adjusting the turbine vanes, may decrease the amount of boost provided.

After exiting turbine 165, exhaust gases flow downstream in exhaust passage 74 to an emission control device 70. Emission control device 70 may include one or more emission control devices, such as one or more catalyst bricks and/or one or more particulate filters. For example, emission control device 70 may include a three-way catalyst configured to chemically reduce nitrogen oxides (NOx) and oxidize carbon monoxide (CO) and hydrocarbons (HC). In some examples, emission control device 70 may additionally or alternatively include a gasoline particulate filter (GPF). After passing through emission control device 70, exhaust gases may be directed out to a tailpipe. As an example, the three-way catalyst may be maximally effective at treating exhaust gas with a stoichiometric air-fuel ratio (AFR), as will be elaborated below.

Exhaust passage 74 further includes a plurality of exhaust sensors in electronic communication with controller 12, which is included in a control system 17. As shown in FIG. 2, exhaust passage 74 includes a first oxygen sensor 90 positioned upstream of emission control device 70. First oxygen sensor 90 may be configured to measure an oxygen content of exhaust gas entering emission control device 70. Exhaust passage 74 may include one or more additional oxygen sensors positioned along exhaust passage 74, such as a second oxygen sensor 91 positioned downstream of emission control device 70. As such, second oxygen sensor 91 may be configured to measure the oxygen content of the exhaust gas exiting emission control device 70. In one example, one or more of oxygen sensor 90 and oxygen sensor 91 may be universal exhaust gas oxygen (UEGO) sensors. Alternatively, a two-state exhaust gas oxygen sensor may be substituted for at least one of oxygen sensors 90 and 91. Exhaust passage 74 may include various other sensors, such as one or more temperature and/or pressure sensors. For example, as shown in FIG. 2, a sensor 96 is positioned within exhaust passage 74 upstream of emission control device 70. Sensor 96 may be a pressure and/or temperature sensor. As such, sensor 96 may be configured to measure the pressure and/or temperature of exhaust gas entering emission control device 70.

Exhaust manifold 85 is coupled to an exhaust gas recirculation (EGR) passage 50 included in an EGR system 56. EGR passage 50 is coupled between exhaust manifold 85 and intake passage 28, downstream of compressor 162. As such, exhaust gases are directed from exhaust manifold 85 to air intake passage 28, downstream of compressor 162, via EGR passage 50, which provides high-pressure EGR. However, in other examples, EGR passage 50 may be coupled to intake passage 28 upstream of compressor 162.

As shown in FIG. 2, EGR passage 50 may include an EGR cooler 52 configured to cool exhaust gases flowing from exhaust manifold 85 to intake passage 28 and may further include an EGR valve 54 disposed therein. Controller 12 is configured to actuate and adjust a position of EGR valve 54 in order to control a flow rate and/or amount of exhaust gases flowing through EGR passage 50. When EGR valve 54 is in a closed (e.g., fully closed) position, no exhaust gases may flow from exhaust manifold 85 to intake passage 28. When EGR valve 54 is in an open position (e.g., from partially open to fully open), exhaust gases may flow from exhaust manifold 85 to intake passage 28. Controller 12 may adjust the EGR valve 54 into a plurality of positions between fully open and fully closed. In other examples, controller 12 may only adjust EGR valve 54 to be either fully open or fully closed. Further, in some examples, a pressure sensor 34 may be arranged in EGR passage 50 upstream of EGR valve 54.

As shown in FIG. 2, EGR passage 50 is coupled to intake passage 28 downstream of a charge air cooler (CAC) 40. CAC 40 is configured to cool intake air as it passes through CAC 40. In an alternative example, EGR passage 50 may be coupled to intake passage 28 upstream of CAC 40 (and downstream of compressor 162). In some such examples, EGR cooler 52 may not be included in EGR passage 50, as CAC cooler 40 may cool both the intake air and recirculated exhaust gases. EGR passage 50 may further include an oxygen sensor 36 disposed therein and configured to measure an oxygen content of exhaust gases flowing through EGR passage 50 from exhaust manifold 85. In some examples, EGR passage 50 may include additional sensors, such as temperature and/or humidity sensors, to determine a composition and/or quality of the exhaust gas being recirculated to intake passage 28 from exhaust manifold 85.

Intake passage 28 further includes throttle 62. As shown in FIG. 2, throttle 62 is positioned downstream of CAC 40 and downstream of where EGR passage 50 couples to intake passage 28 (e.g., downstream of a junction between EGR passage 50 and intake passage 28). A position of a throttle plate 64 of throttle 62 may be adjusted by controller 12 via a throttle actuator (not shown) communicatively coupled to controller 12. By modulating throttle 62 while operating compressor 162, a desired amount of fresh air and/or recirculated exhaust gas may be delivered to the engine cylinders at a boosted pressure via intake manifold 44.

To reduce compressor surge, at least a portion of the air charge compressed by compressor 162 may be recirculated to the compressor inlet. A compressor recirculation passage 41 may be provided for recirculating compressed air from a compressor outlet, upstream of CAC 40, to a compressor inlet. A compressor recirculation valve (CRV) 42 may be provided for adjusting an amount of flow recirculated to the compressor inlet. In one example, CRV 42 may be actuated open via a command from controller 12 in response to actual or expected compressor surge conditions.

Intake passage 28 may include one or more additional sensors (such as additional pressure, temperature, flow rate, and/or oxygen sensors). For example, as shown in FIG. 2, intake passage 28 includes MAF sensor 48 disposed upstream of compressor 162 in intake passage 28. An intake pressure and/or temperature sensor 31 is also positioned in intake passage 28 upstream of compressor 162. An intake oxygen sensor 35 may be located in intake passage 28 downstream of compressor 162 and upstream of CAC 40. An additional intake pressure sensor 37 may be positioned in intake passage 28 downstream of CAC 40 and upstream of throttle 62 (e.g., a throttle inlet pressure sensor). In some examples, as shown in FIG. 2, an additional intake oxygen sensor 39 may be positioned in intake passage 28 between CAC 40 and throttle 62, downstream of the junction between EGR passage 50 and intake passage 28. Further, MAP sensor 122 and an intake manifold temperature sensor 123 are shown positioned within intake manifold 44, upstream of the engine cylinders.

Engine 10 may be controlled at least partially by control system 17, including controller 12, and by input from the vehicle operator (as described above with respect to FIG. 1). Control system 17 is shown receiving information from a plurality of sensors 16 (various examples of which are described herein) and sending control signals to a plurality of actuators 83. As one example, sensors 16 may include the pressure, temperature, and oxygen sensors located within intake passage 28, intake manifold 44, exhaust passage 74, and EGR passage 50, as described above. Other sensors may include a throttle inlet temperature sensor for estimating a throttle air temperature (TCT) coupled upstream of throttle 62 in the intake passage. Further, it may be noted that engine 10 may include all or only a portion of the sensors shown in FIG. 2. As another example, actuators 83 may include fuel injectors 66, throttle 62, CRV 42, EGR valve 54, and spark plugs 92. Actuators 83 may further include various camshaft timing actuators coupled to the cylinder intake and exhaust valves (as described above with reference to FIG. 1). Controller 12 may receive input data from the various sensors, process the input data, and trigger the actuators in response to the processed input data based on instruction or code programmed in a memory of controller 12 corresponding to one or more routines. An example control routine (e.g., method) is described herein at FIG. 5.

Continuing to FIG. 3, a second example configuration of engine 10 is shown. Specifically, FIG. 3 shows an example engine system 300 that also includes cylinders 13, 14, 15, and 18 arranged in an inline-4 configuration. Except for the differences described below, engine system 300 may be substantially identical to engine system 200 of FIG. 2. As such, components previously introduced in FIGS. 1 and 2 are represented with the same reference numbers and are not re-introduced.

Specifically, as shown in FIG. 3, inside cylinders 14 and 15 channel exhaust gases to an exhaust manifold 81 via exhaust ports 86, and outside cylinders 13 and 18 channel exhaust gases to exhaust manifold 85 via exhaust ports 87. Exhaust manifold 81 (e.g., a first exhaust manifold) and exhaust manifold 85 (e.g., a second exhaust manifold) do not directly communicate with one another (e.g., no passage directly couples the two exhaust manifolds to one another).

In the example shown in FIG. 3, turbine 165 is a twin scroll (or dual volute) turbine. In such an example, a first, hotter scroll of the twin scroll turbine may be coupled to exhaust manifold 85, and a second, cooler scroll of the twin scroll turbine may be coupled to exhaust manifold 81 such that exhaust manifold 81 and exhaust manifold 85 remain separated up to the turbine wheel. For example, the two scrolls may each introduce gas around the entire perimeter of the wheel, but at different axial locations. Alternatively, the two scrolls may each introduce gas to the turbine over a portion of the perimeter, such as over approximately 180 degrees of the perimeter. The configuration of engine system 300 may enable engine performance enhancement while reducing vehicle emissions. In particular, by including separate exhaust manifolds that do not directly communicate and that receive exhaust gases from different cylinders, the gases received by first exhaust manifold 81 may have a different AFR than the gases received by second exhaust manifold 85, as will be further described below.

Exhaust manifold 85 is directly coupled to EGR passage 50, whereas exhaust manifold 81 is not coupled to EGR passage 50. As such, exhaust gases recirculated via EGR passage 50 originate from outside cylinders 13 and 18 only (via exhaust manifold 85) and not from inside cylinders 14 and 15 (via exhaust manifold 81). By coupling EGR passage 50 to only one exhaust manifold, the AFR of the recirculated exhaust gas may be selectively enriched to provide knock and efficiency benefits to engine 10. For example, enriched EGR may contain relatively high concentrations (or amounts) of CO and hydrogen gas compared with lean EGR and stoichiometric EGR. CO and hydrogen gas have high effective octane numbers, offsetting the knock limit of each cylinder and creating an opportunity for additional spark advance.

Both engine system 200 of FIG. 2 and engine system 300 of FIG. 3, as well as additional engine system configurations not explicitly illustrated, may be operated with a split lambda fueling strategy. The split lambda fueling strategy (also referred to as operation in a split lambda mode herein) includes operating a first set of cylinders at a first, rich AFR and a second (e.g., remaining) set of the engine cylinders at a second, lean AFR while maintaining stoichiometry at a downstream catalyst. Herein, the AFR will be discussed as a relative AFR, defined as a ratio of an actual AFR of a given mixture to stoichiometry and represented by lambda ($\lambda$). A lambda value of 1 occurs during stoichiometric operation (e.g., at stoichiometry), wherein the air-fuel mixture produces a complete combustion reaction. A rich feed ($\lambda$, <1) results from air-fuel mixtures with more fuel relative to stoichiometry. For example, when a cylinder is enriched, more fuel is supplied to the cylinder via fuel injector 66 than for producing a complete combustion reaction with an amount of air in the cylinder, resulting in excess, unreacted fuel. In contrast, a lean feed ($\lambda$>1) results from air-fuel mixtures with less fuel relative to stoichiometry. For example, when a cylinder is enleaned, less fuel is delivered to the cylinder via fuel injector 66 than for producing a complete combustion reaction with the amount of air in the cylinder, resulting in excess, unreacted air.

During nominal engine operation, the AFR may fluctuate about stoichiometry, such as by $\lambda$ generally remaining within 2% of stoichiometry. For example, the engine may transition from rich to lean and from lean to rich between injection cycles, resulting in an "average" operation at stoichiometry. This is different than operation in the split lambda mode, where the engine cylinders are split between rich and lean operation during a single engine cycle. Further, the split rich and lean operation may be maintained over a plurality of engine cycles. As an example, the first set of cylinders may be operated at a rich AFR having a lambda value in a range from 0.95-0.8 (e.g., 5-20% rich), which is richer than the nominal fluctuation about stoichiometry. The second set of cylinders may be operated at a corresponding lean AFR to maintain overall stoichiometry to increase an efficiency of emission control device 70 and decrease vehicle emissions. For example, a degree of enleanment of the second set of cylinders may selected based on a degree of enrichment of the first set of cylinders so that the exhaust gas from the first set of cylinders may mix with the exhaust gas from the second set of cylinders to form a stoichiometric mixture, even while none of the cylinders are operated at stoichiometry.

The particular configuration of engine system 300 of FIG. 3 enables the rich exhaust gas from the first set of cylinders to be isolated from the lean exhaust gas from the second set of cylinders prior to mixing at and downstream of turbine 165. As one example, the first set of cylinders may include the outside cylinders 13 and 18, while the second set of cylinders may include the inside cylinders 14 and 15. In such an example, the inside cylinders may feed lean exhaust gas specifically to exhaust manifold 81, and the outside cylinders may feed rich exhaust gas to exhaust manifold 85. In another example, the first set of cylinders may include the inside cylinders 14 and 15, and the second set of cylinders may include the outside cylinders 13 and 18. Further, because EGR passage 50 is coupled to exhaust manifold 85, the exhaust gas recirculated to intake passage 28 (and supplied to every cylinder of engine 10) may be selectively enriched or enleaned based on the AFR of the outside cylinders during the split lambda operation.

Because engine system 200 of FIG. 2 only includes one exhaust manifold 85 coupled to every cylinder, the EGR routed through EGR passage 50 may be maintained substantially stoichiometric during split lambda operation. Additionally, because the cylinders are coupled to the same exhaust manifold, other cylinder groupings may also be used. For example, the first set of cylinders may include cylinders 13 and 14, and the second set of cylinders may include cylinders 15 and 18. As another example, the first set of cylinders may include cylinders 14 and 18, and the second set of cylinders may include cylinders 13 and 15.

While operating an engine with an even number of cylinders in the split lambda mode may include operating with a first half of a total number of the cylinders rich and a second, remaining half the total number of the cylinders lean, it may be understood that engines having an odd number of cylinders also may be operated in the split lambda mode. For example, one cylinder may be maintained at stoichiometry while the remaining cylinders are divided between the rich and lean operations. As such, the split lambda mode may still be employed while maintaining global stoichiometry.

Figure 4:
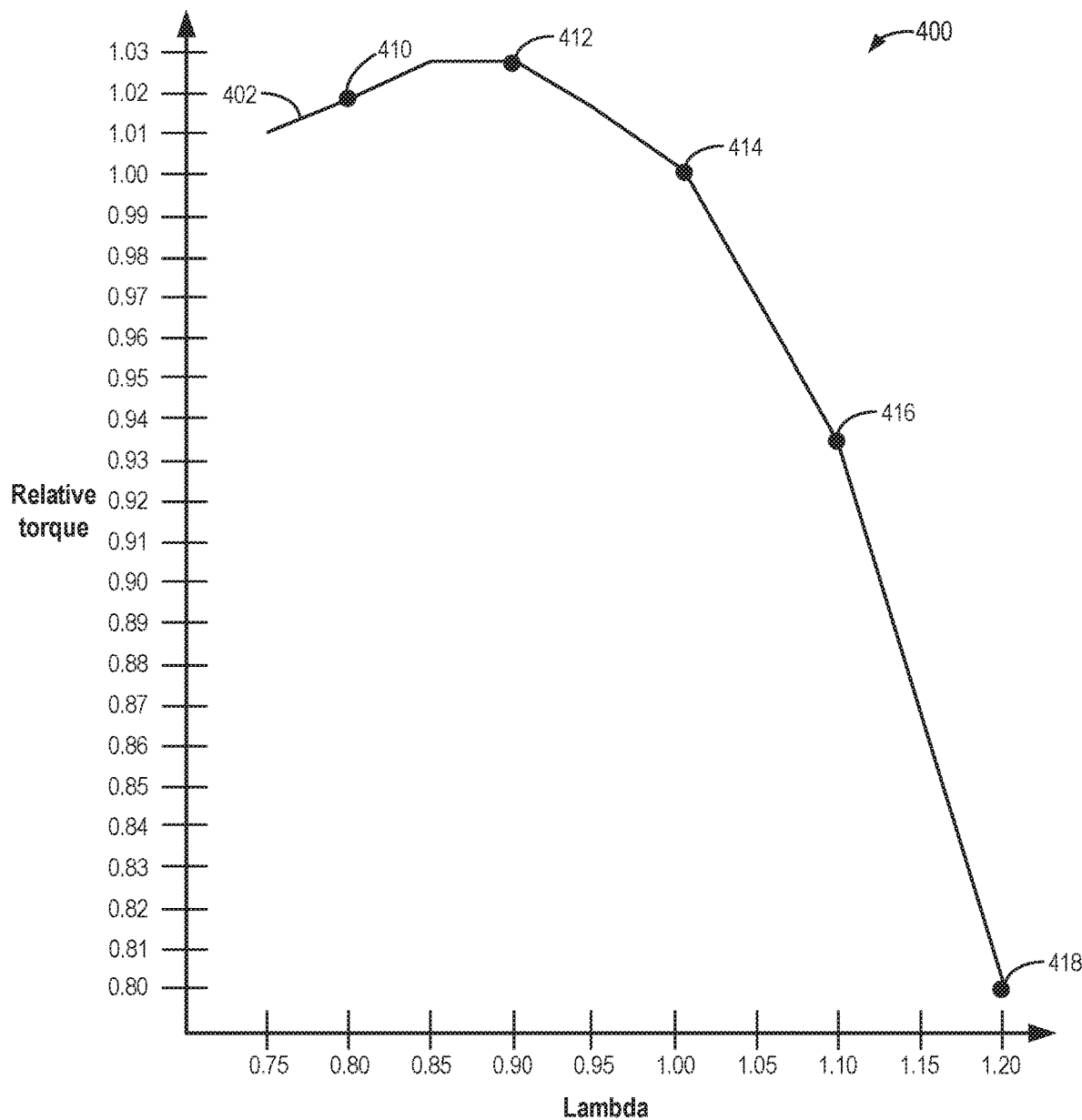
FIG. 4 shows an example plot of a relationship between lambda and a relative torque produced by a cylinder of an engine system.

According to the present disclosure, operation with the split lambda fueling strategy may provide exhaust component temperature control during an engine torque reduction. Notably, a relationship between AFR and torque produced in a cylinder of a spark ignition engine may not be nonlinear. FIG. 4 provides an example plot 400 of a relationship between lambda and torque in a cylinder of a spark ignition engine. The engine may be engine 10 included in any of the engine system configurations shown in FIGS. 1-3, for example. For plot 400, the vertical axis shows cylinder torque relative to a torque output at stoichiometric operation. Thus, a relative torque of 1.00 corresponds to the cylinder torque output at stoichiometry. A relative torque less than 1.00 corresponds to a torque output that is less than stoichiometry, and a relative torque greater than 1.00 corresponds to a torque output that is greater than stoichiometry. The horizontal axis shows lambda ($\lambda$), with lambda values less than one ($\lambda$<1) representing rich AFRs, and lambda values greater than one ($\lambda$>1) representing lean AFRs.

Plot 400 includes a non-linear curve 402 that relates a lambda value of a cylinder to a corresponding relative torque output of the cylinder. For example, at a point 412, curve 402 shows that operating the cylinder with a rich lambda value of 0.90 produces a relative torque between 1.02 and 1.03 (e.g., 1.026), which is greater than the stoichiometric torque output (e.g., shown by a point 414). At a point 416, curve 402 shows that operating the cylinder a lean lambda value of 1.10 produces a relative torque between 0.93 and 0.94 (e.g., 0.933), which is less than the stoichiometric torque output. Notably, the lambda values of 1.10 and 0.90 average to a value of 1.00 (e.g., stoichiometry) without averaging to a stoichiometric torque output of 1.00. For example, relative torque output averages to approximately 0.98, which is less than 1.00. As another example, at a point 410, curve 402 shows that operating the cylinder with a rich lambda value of 0.80 produces a relative torque between 1.01 and 1.02 (e.g., 1.019), which is greater than the stoichiometric torque output (e.g., as shown by point 414). At a point 418, curve 402 shows that operating the cylinder with a lean value of 1.20 produces a relative torque of approximately 0.80, which is less than the stoichiometric torque output. As in the previous example, the lambda values of 0.80 and 1.20 average to a value of 1.00 (e.g., stoichiometry) without averaging to a stoichiometric torque output. For example, the relative torque output averages to approximately 0.91, which is less than 1.00. This is also illustrated in the shape of curve 402, which shows a smaller relative torque increase between points 414 and 410 and a larger relative torque decrease between points 414 and 418.

Thus, plot 400 demonstrates the non-linear relationship between lambda and torque. As a first example, the engine may be operated with a lambda value of 0.90 for a first set of cylinders and a lambda value of 1.10 for a second, remaining set of cylinders to reduce torque by approximately 2% while maintaining globally stoichiometric operation. In another example, the engine may be operated with a lambda value of 0.80 for the first set of cylinders and a lambda value of 1.2 for a second set of cylinders, to reduce torque by approximately 9% while maintaining globally stoichiometric operation.

Operating an engine with different lambda values split between distinct sets of cylinders also reduces a temperature of an exhaust gas, enabling additional use of spark retard to provide additional fast torque reductions without increasing exhaust component temperatures relative to stoichiometric operation. Spark retard is traditionally used to provide fast engine torque reductions but increases the exhaust gas temperature. However, when operating an engine in split lambda mode, an enriched set of cylinders contributes uncombusted fuel to the exhaust gas. This uncombusted fuel has a technical effect of cooling exhaust system components, thus lowering exhaust gas temperature relative to stoichiometric operation. By transitioning the engine into split lambda before applying disparate levels of spark retard to each set of cylinders, the exhaust gas temperature may be controlled while obtaining requested fast torque reductions, as temperature increases resulting from spark retard are offset by temperature decreases resulting from the split lambda fueling strategy. Further, split lambda operation maintains global stoichiometry and offers vehicle decreased vehicle emissions compared to other torque reduction methods including spark retard and fuel cuts (e.g., globally lean engine operation). In this way, fast reductions in torque may be obtained by means of an integrated strategy of a lambda split (e.g., a difference between an AFR of a first set of cylinders and an AFR of a second set of cylinders) and spark retard, referred to herein as a "split lambda torque reduction mode," without increasing vehicle emissions or degrading exhaust components via temperature increases.

Figure 5:
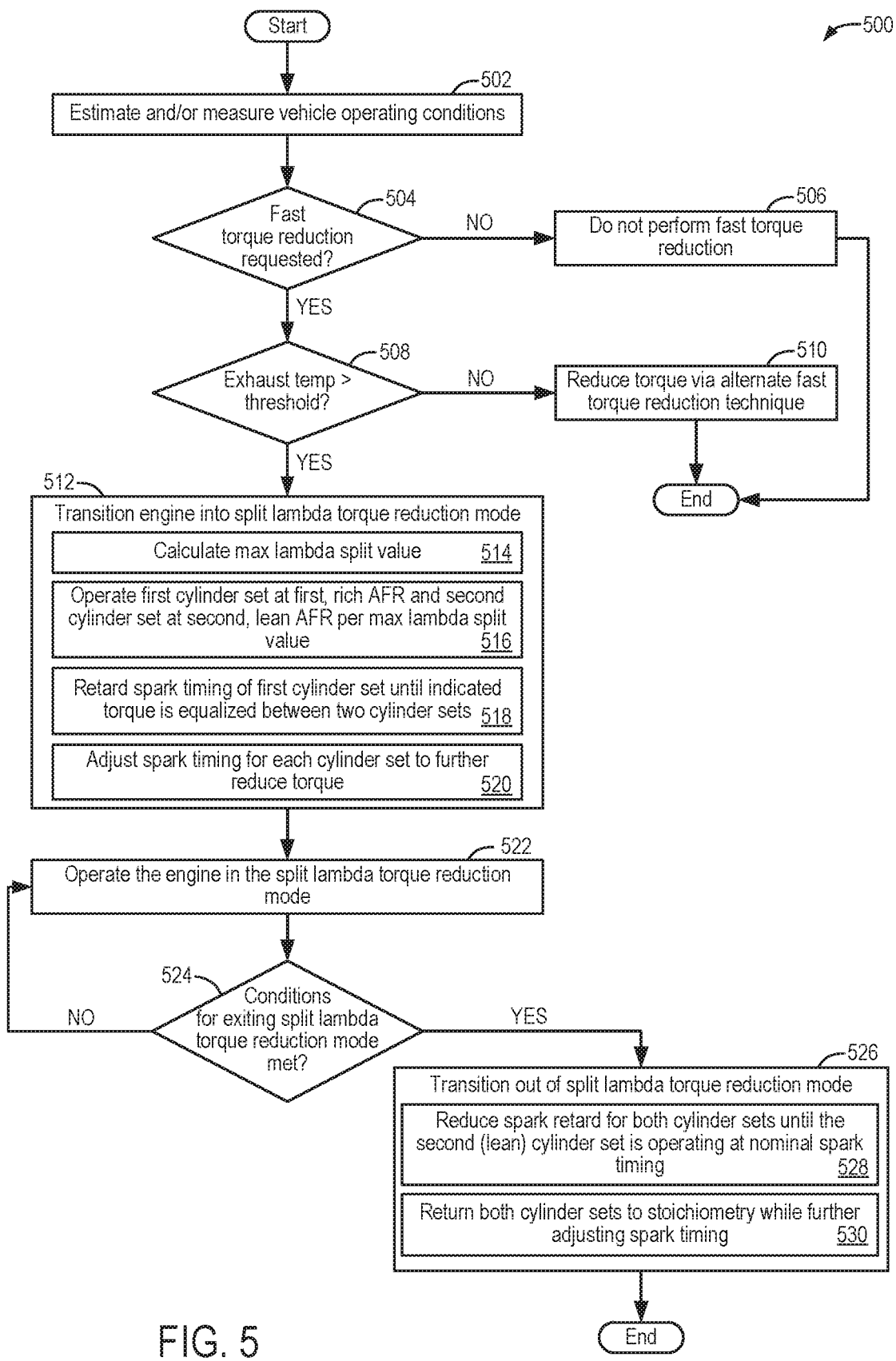
FIG. 5 depicts an example method for transitioning into and out of a split lambda mode and an ignition delay mode based on requested torque reductions.
Figure 6:
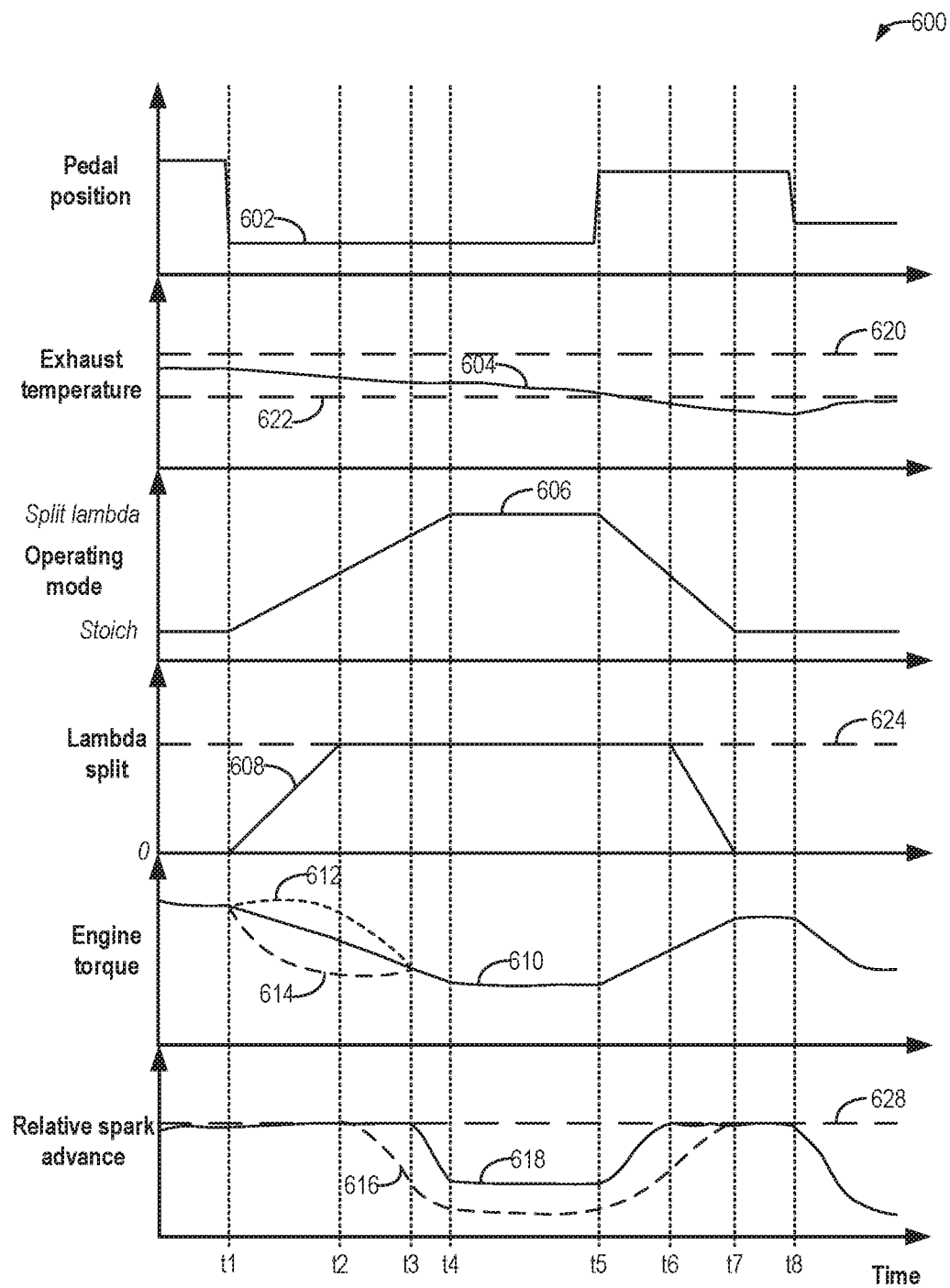
FIG. 6 shows a prophetic example timeline for adjusting engine operation to transition between various operating modes, including a stoichiometric mode, a split lambda mode, and a delayed ignition timing mode based on a torque reduction requirement.

Turning now to FIG. 5, a flowchart of a method 500 for operating an engine in a split lambda torque reduction mode is shown. For example, the engine may be transitioned into operating in the split lambda torque reduction mode based on an engine torque reduction request in order to reduce heat related exhaust component degradation and reduce vehicle emissions during the torque reduction. Instructions for carrying out method 500 and the rest of the methods included herein may be executed by a controller (e.g., controller 12 of FIGS. 1-3) based on instructions stored on a memory of the controller and in conjunction with signals received from sensors of the engine system, such as the sensors described above with reference to FIGS. 1-3, including a signal PP from a pedal position sensor (e.g., pedal position sensor 118 of FIG. 1). The controller may employ engine actuators of the engine system to adjust engine operation, such as by adjusting a spark timing of a spark provided via a spark plug (e.g., spark plug 92 of FIGS. 1-3), according to the methods described below.

At 502, method 500 includes estimating and/or measuring vehicle operating conditions. The vehicle operating conditions may include both vehicle and engine operating conditions. Engine operating conditions may include, for example, engine temperature, engine speed, engine load, driver-demanded torque, a throttle valve position, one or more exhaust temperatures, a selected gear (e.g. in transmission 167 of FIG. 1), a commanded air-fuel ratio (AFR), a measured AFR, spark timing, etc. As one example, driver-demanded torque may be determined based on output from a pedal position sensor coupled to an accelerator pedal. As another example, at least one of the one or more exhaust temperatures may be determined based on a temperature measured by an exhaust gas temperature sensor (e.g., sensor 96 of FIGS. 2 and 3). In some examples, the measured temperature may be used to infer a temperature of a turbocharger turbine (e.g., turbine 165 of FIGS. 2 and 3) and/or a temperature of an emission control device (e.g., emission control device 70 of FIGS. 2 and 3). In another example, the turbine temperature may be determined based on an output from a separate temperature sensor positioned at an inlet of the turbine.

At 504, method 500 includes determining if a fast torque reduction is requested. A fast torque reduction request may correspond to the desired engine torque being less than a current engine torque by more than a threshold amount. For example, the fast torque reduction may be requested in response to a tip-out condition where the driver releases the accelerator pedal. In another example, the fast torque reduction may be requested in response to a gear shift event, such as during an upshift from a first gear with a higher speed ratio to a second gear with a lower speed ratio. In still another example, the fast torque reduction may be requested for traction control purposes, such as to prevent wheel slip.

If a fast torque reduction is not requested, method 500 proceeds to 506 and includes not performing a fast torque reduction. As one example, a slow torque reduction may be requested, which may be executed by via air flow control, for example. As another example, a torque increase may be requested, which may be executed by adjusting engine air flow, spark timing, and/or fueling, for example. As still another example, the engine torque may be maintained, such as by maintaining the current engine operating parameters.

As one example, the controller may provide the desired engine torque via airflow, spark timing, and/or AFR control. That is, an amount of air and/or fuel provided to the engine and the spark timing may be coordinated to produce the desired engine torque. For example, the controller may adjust an opening of the throttle valve (e.g., throttle valve 62 of FIGS. 1-3) to adjust air flow, the air flow increasing as the opening of the throttle valve increases, the opening of the throttle valve increasing as the torque demand increases. Further, if the engine is operating in a boosted condition, the amount of boost provided may be adjusted by adjusting a speed of a compressor of the turbocharger (e.g., compressor 162 of FIGS. 2 and 3), such as by adjusting an opening of a turbocharger wastegate, with the amount of boost increasing as the opening of the wastegate decreases (thereby increasing the speed of the turbine and, thus, the speed of the compressor). As another example, spark may be provided at or near MBT in order to maximize engine power for the given engine load. As still another example, an amount of fuel provided may be adjusted by adjusting pulse widths of signals (e.g., FPW) provided to fuel injectors (e.g., fuel injectors 66 FIGS. 1-3), with the amount of fuel provided increasing as the pulse widths increase. Following 506, method 500 ends.

Returning to 504, if a fast torque reduction is requested, method 500 proceeds to 508 and includes determining if an exhaust temperature is greater than a threshold temperature. In one example, the exhaust temperature may refer to the temperature of the turbine, and the threshold temperature may be a non-zero, pre-determined temperature above which an additional temperature increase may degrade the turbine. In another example, the temperature may refer to the temperature of the emission control device, and the threshold temperature may be a non-zero, pre-determined temperature above which an additional temperature increase may degrade the emission control device. In a further example, the temperature may refer to a bulk exhaust gas temperature, and the threshold temperature may be a non-zero, pre-determined temperature above which one or more exhaust components (e.g., the turbine and the emission control device) may become degraded if the exhaust temperature is further increased.

If the threshold temperature is not exceeded (e.g., the exhaust temperature is less than or equal to the threshold temperature), method 500 proceeds to 510 and includes utilizing an alternate torque reduction technique. For example, the controller may employ spark retard to reduce the engine torque when the exhaust temperature is less than the threshold temperature, as the additional exhaust heat generated due to spark retard may not degrade the exhaust components. The retarded spark timing may reduce an amount of energy that each combustion reaction applies to the piston in each cylinder (e.g., compared with MBT spark timing). Thus, in a first condition that includes the exhaust temperature being less than or equal to the threshold temperature, engine torque may be quickly reduced via spark retard. Following 508, method 500 ends.

If instead the exhaust temperature is greater than the threshold temperature at 508, method 500 proceeds to 512 and includes transitioning the engine into the split lambda torque reduction mode. As elaborated above with respect to FIGS. 2-4, split lambda operation includes operating a first set of engine cylinders at a first, rich AFR and a second set of the engine cylinders at a second, lean AFR. In some examples, the split lambda operation may further include operating a third cylinder set (e.g., one cylinder) at stoichiometry, such as when the engine includes an odd number of cylinders. Each of the first cylinder set (e.g., group or number of cylinders) and the second cylinder set may include one or more cylinders, with a number of cylinders in the first cylinder set equal to a number of cylinders in the second cylinder set. For example, when the engine includes an even number of cylinders, the cylinders may be equally divided between the rich and lean cylinders (e.g., half of the cylinders are included in the first set, and half of the cylinders are included in the second set). Further, although the term "set" is used herein and the method will be described for an engine configuration including four or more cylinders, such as the engine configurations shown in FIGS. 2 and 3 (e.g., resulting in at least two rich cylinders and at least two lean cylinders), in other examples, there may be only one rich cylinder and only one lean cylinder (e.g., such as for two- and three-cylinder engines). The rich AFR and the lean AFR may be balanced to produce a stoichiometric mixture at the downstream emission control device. In particular, the split lambda operation enables torque reduction due to differential torque outputs from the rich and lean cylinders, as described above with respect to FIG. 4. Thus, during a second condition that includes the exhaust gas temperature being greater than the temperature threshold, engine torque may be quickly reduced via the split lambda torque reduction mode.

Transitioning the engine into the split lambda torque reduction mode includes determining a maximum lambda split value, as indicated at 514. As used herein, the term "lambda split" refers to a difference between the rich AFR (e.g., of the first cylinder set) and the lean AFR (e.g., of the second cylinder set). As an example, the controller may determine a maximum lambda split value for the torque reduction based on the engine operating conditions (e.g., as measured at 502), in particular, based on the engine load. For example, the controller may input the engine load into a look-up table, function, or map, which may output the corresponding maximum lambda split value for the given engine load, as determined based on combustion stability. If the engine were to operate with lambda split values greater than the maximum lambda split value, engine performance may be degraded, for example, such as due to an occurrence of misfire (e.g., due to operating the second set of cylinders too lean) and emissions degradation (e.g., due to unburnt fuel at the emission control device).

Transitioning the engine into the split lambda torque reduction mode further includes operating the first cylinder set at the first, rich AFR and the second cylinder set at the second, lean AFR per the maximum split lambda value, as indicated at 516. In one example, the lambda split between the first cylinder set and the second cylinder set may be gradually increased over a plurality of engine cycles. For example, the lambda split may be incrementally increased cycle-by-cycle until the maximum lambda split is reached. This may include the controller further enriching the first set of cylinders each engine cycle and further enleaning the second set of cylinders by a corresponding amount to maintain a stoichiometric exhaust gas mixture at the emission control device. For example, a degree of the enrichment of the first set of cylinders may be equal to a degree of the enleanment of the second set of cylinders each engine cycle. Thus, as one example, the difference between the first, rich AFR and the second, lean AFR may increase each engine cycle, resulting in a cycle-by-cycle torque reduction. In another example, the lambda split between the first set of cylinders and the second set of cylinders may be stepped to the maximum lambda split over one engine cycle. The controller may adjust a pulse width of a signal FPW sent to the fuel injector of each cylinder based on the commanded AFR of the particular cylinder (e.g., whether the cylinder is in the first set or the second set) and a cylinder air charge amount, such as via a look-up table or function, in order to operate the first cylinder set at the rich AFR and the second cylinder set at the lean AFR.

As an illustrative, non-limiting example, the controller may determine a maximum lambda split of 0.2. In this example, the first, rich AFR is set to 0.9, and the second, lean AFR is set to 1.1, thus maintaining globally stoichiometric operation. Using the example relationship described above with respect to FIG. 4, the lambda split of 0.2 would result in a 98% average engine torque output (e.g., across an engine cycle, wherein each cylinder fires once in a designated firing order) compared with operating each cylinder at stoichiometry. Thus, the average engine torque output may be reduced by approximately 2% in this example just by phasing in the lambda split.

In some examples, when the engine is operating in an economy (e.g., "eco") mode where fuel economy is prioritized over reducing noise, vibration, and harshness (NVH), the fast torque reduction may be provided by the lambda split only until the requested torque reduction exceeds the reduction available by operating in the split lambda mode (e.g., due to reaching the maximum lambda split). Therefore, in such examples, the engine may be operated with the split lambda fueling strategy without additional spark timing adjustments, even though torque is not balanced between the rich fueled cylinders and the lean fueled cylinders.

In other examples, such as when NVH reduction is prioritized or when the torque reduction request exceeds the amount available via the lambda split, transitioning the engine into the split lambda torque reduction mode further includes retarding spark timing of the first cylinder set (e.g. the cylinder set with the rich AFR) until indicated torque is equalized between the two cylinder sets, as indicated at 518. That is, the rich cylinder set produces a higher torque output than the lean cylinder set, and so retarding the spark timing of the first cylinder set compensates for the difference in torque output to bring the indicated torque of the rich cylinder set down to the indicated torque of the lean cylinder set. Continuing with the above illustrative example, balancing the torque output of the first, rich cylinder set and the second, lean cylinder while operating with the lambda split value at 0.2 may bring the average torque output of the engine from about 98% relative to stoichiometry to about 93% relative to stoichiometry.

As one example, the controller may retard the spark timing of the first set of cylinders incrementally, such as by further retarding the spark timing by a predetermined amount each engine cycle until torque is balanced between the two cylinder sets. The torque may be considered balanced when the torque output by the rich cylinders is within a pre-defined, non-zero threshold difference or percentage from the torque output by the lean cylinders, as inferred based on output from a crankshaft position sensor or torque sensor, for example. As another example, the controller may directly determine the amount of spark timing retard to apply to each cylinder of the first cylinder set by inputting one or more of the difference in the torque output by the two cylinder sets and the lambda split between the two cylinders sets into a look-up table, function, or map, which may output the retarded spark timing for the rich cylinders that is anticipated to balance the torque output between the rich and lean cylinders. Further, the controller may generate a control signal that is sent the ignition system to actuate the spark plug of each cylinder at the determined spark timing for that individual cylinder.

Transitioning the engine into the split lambda torque reduction mode additionally includes adjusting the spark timing for each cylinder set to further reduce torque, as indicated at 520. For example, once the controller determines that the torque is equalized between the two sets of cylinders, additional spark retard (e.g., from MBT spark timing) may be employed for a further reduction in torque while the split lambda fueling ensures that the exhaust temperature remains below the threshold temperature (e.g., as defined above at 508). As an example, the controller may refer to one or more look-up tables to determine an amount of spark retard for each set of cylinders, such as by inputting the desired torque reduction and the lambda split into the one or more look-up tables. As another example, the controller may determine the retarded spark timing for each set of cylinders based on logic rules that are a function of the requested torque reduction and the commanded AFR of the cylinder or cylinder set. It may be understood that the determined spark timing for the rich cylinder set may be further retarded than the spark timing for the lean cylinder set in order to maintain torque balance between the rich and lean cylinders. In some examples, the spark timing for each cylinder set may be iteratively adjusted across a plurality of engine cycles until each cylinder set reaches the determined timing and/or the engine torque reaches the desired decreased engine torque. As an example, the spark retard of the rich cylinder set may be initiated at a faster rate compared with the lean cylinder set so that both cylinder sets reach their corresponding determined spark timing at the same engine cycle, with the indicated torque balanced between the two cylinder sets each engine cycle. Thus, after the lambda split is phased in and the torque is balanced between the rich and lean cylinders by retarding spark timing in the rich cylinders only, the engine torque output may be further reduced by retarding spark timing in both the rich and lean cylinders until the requested torque reduction is achieved.

At 522, method 500 includes operating the engine in the split lambda torque reduction mode. Thus, the engine may be transitioned into (e.g., at 512) and operated in the split lambda torque reduction mode (e.g., at 522) to provide exhaust component temperature relief and reduced vehicle emissions. For example, operating in the split lambda torque reduction mode may enable the lower demanded torque to be provided while slower-acting torque reduction responses, such as throttling, begin to take effect.

At 524, method 500 includes determining if conditions for exiting the split lambda torque reduction mode are met. As one example, the conditions for exiting the split lambda torque reduction mode may include an increase in the torque demand, such as due to a driver tip-in event. As another example, the conditions for exiting the split lambda torque reduction mode may include the exhaust temperature falling below the threshold temperature defined above at 508. Any or all of the conditions may be met for an exit from the torque reduction mode to be confirmed.

If the conditions for exiting the torque reduction mode are not met (e.g., none of the exit conditions are met), method 500 may return to 522 to continues to operating the engine in the split lambda torque reduction mode. As such, decreased engine torque may continue to be provided relative to operating the engine at stoichiometry and with spark timing advanced toward MBT.

Once the conditions for exiting the split lambda torque reduction mode are met, method 500 proceeds to 526 and includes transitioning out of the split lambda torque reduction mode. Transitioning the engine out of the split lambda torque reduction mode includes reducing the amount of spark retard applied to each cylinder until the second (lean) set of cylinders is operating at nominal spark timing, as indicated at 528. As an example, the controller may refer to one or more look-up tables to determine the nominal spark timing for each set of cylinders, such as by inputting engine operating parameters (e.g., engine speed, engine load, commanded AFR) into the one or more look-up tables. As another example, the controller may determine the nominal spark timing for each set of cylinders based on logic rules that are a function of the engine speed, the engine load, and the commanded AFR of the cylinder or cylinder set. It may be understood that the nominal spark timing for the rich cylinder set may be different (e.g., more retarded) than the spark timing for the lean cylinder set in order to maintain torque balance between the rich and lean cylinders. In some examples, the spark timing for each cylinder set may be iteratively adjusted across a plurality of engine cycles until the lean cylinder set reaches the corresponding nominal spark timing. In such an example, the rich cylinder set may remain retarded from the nominal spark timing in order to maintain balanced indicated torque between the rich cylinders and the lean cylinders. As one example, the nominal spark timing may be at or near MBT spark timing for each cylinder set.

Transitioning the engine out of the split lambda torque reduction mode at 526 further includes returning both cylinder sets to stoichiometry while further adjusting the spark timing, as indicated at 530. As one example, the magnitude of the lambda split may be decreased over a plurality of engine cycles, such as by decreasing the difference between the rich AFR and the lean AFR each engine cycle, until the lambda split is equal to zero and the engine is uniformly operated at stoichiometry. This may include the controller decreasing the degree of enrichment of the first set of cylinders each engine cycle and adjusting the lean AFR of the second set of cylinders by a corresponding amount to maintain the stoichiometric exhaust gas mixture at the emission control device each engine cycle. As one non-limiting illustrative example, the rich AFR may be increased by a lambda value of 0.02 each engine cycle, with the lean AFR correspondingly increased. In an alternative example, the AFR of each cylinder may be returned to stoichiometry over a single engine cycle.

In examples where the lambda split is gradually decreased, the spark timing may be individually adjusted for each cylinder set each engine cycle in order to maintain balanced torque output between the first cylinder set and the second cylinder set. For example, the nominal spark timing for the lean cylinder set may change each engine cycle as the commanded AFR changes, which the controller may determine as described above at 528. As another example, a degree of spark retard applied to the rich cylinders may decrease each engine cycle as the degree of enrichment decreases. For example, the controller may input the first, rich AFR into one or more look-up tables, algorithms, or maps to determine both the nominal spark timing for the given AFR and a spark retard offset to apply to the nominal spark timing to achieve balanced torque with the lean cylinder set. When the cylinders are returned to stoichiometry, whether gradually or over a single engine cycle, the controller may adjust the spark timing to the nominal spark timing for operating the engine at stoichiometry at the current engine speed and load, and the spark timing for every cylinder may be approximately the same. After 530, method 500 ends.

In this way, method 500 provides a method for fast cycle-to-cycle torque reductions in the presence of exhaust temperature constraints. In particular, due to the non-linear relationship between cylinder torque and cylinder AFR, the split lambda fueling strategy alone reduces engine torque while decreasing the exhaust temperature due to a cooling effect of unburnt fuel from the rich-operating cylinders. By combining the split lambda fueling strategy with spark retard, even greater torque reductions may be achieved, while the split lambda fueling offsets the increased exhaust temperature effect of operating with spark retard. Further, because global stoichiometry is maintained between the rich and lean cylinders, vehicle emissions are reduced compared with fuel cut and global enleanment for torque reduction.

In one example, the method may include determining a first condition, and in response thereto, reducing engine torque via spark retard with stoichiometric fueling in every engine cylinder; and determining a second condition (which occur when the first condition is not present), and in response thereto, reducing engine torque by operating a first set of engine cylinders with rich fueling and a second set of engine cylinders with lean fueling while retarding spark timing differently in the first set and the second set. In some examples, reducing engine torque via spark retard with stoichiometric fueling in every engine cylinder occurs while or during the first condition, and reducing engine torque by operating the first set of engine cylinders with rich fueling and the second set of engine cylinders with lean fueling while retarding spark timing differently in the first set and the second set occurs while the first condition is not present and/or while or during the second condition. Further, the first condition may include an exhaust temperature being less than a threshold temperature, and the second condition may include the exhaust temperature being greater than the threshold temperature.

Further, instructions stored in memory may include instructions for determining the first condition from a signal received from an exhaust temperature sensor, and in response, reducing engine torque via spark retard with stoichiometric fueling in every engine cylinder by instructions for sending a spark advance signal with a same retarded spark timing to a spark plug coupled to every engine cylinder and instructions for sending a same fuel pulse width signal to the fuel injector coupled to every engine cylinder. Instructions stored in memory may further include instructions for determining the second condition from the signal received for the exhaust temperature sensor, and in response, reducing engine torque by operating the first set of engine cylinders with rich fueling and the second set of engine cylinders with lean fueling while retarding spark timing differently in the first set and the second set by instructions for sending a different spark advance signal with a different, further retarded spark timing to a spark plug coupled to the first set of engine cylinders than the second set and instructions for sending a different, greater fuel pulse width signal to the fuel injector coupled to the first set of engine cylinders than the second set. As a further example, instructions stored in memory may include instructions for differentiating between the first condition and the second condition based on the signal received from the exhaust gas sensor and determining whether to perform one or more of each of actions operating the first set of engine cylinders with rich fueling and the second set of engine cylinders and adjusting spark timing based on a determination of whether the first condition is present and a determination of whether the second condition is present.

Next, FIG. 6 shows an example timeline 600 of transitioning an engine between different operating modes responsive to a changing engine torque demand. The engine may be engine 10 included in either of the engine system configurations shown in FIGS. 2-3, for example. Pedal position is shown in plot 602, an exhaust temperature is shown in plot 604, an operating mode is shown in plot 606, a lambda split value is shown in plot 608 (e.g., a difference between lambda values for two cylinder sets), an average engine torque across the engine is shown in plot 610, an engine torque produced by a first set of engine cylinders is shown in short-dashed plot 612, an engine torque produced by a second set of engine cylinders is shown in long-dashed plot 614, a delivered spark advance in the first set of engine cylinders is shown in plot dashed plot 616, and a delivered spark advance of the second set of engine cylinders is shown in solid plot 618. Further, a first, lower exhaust temperature threshold is shown by a dashed line 622, a second, higher exhaust temperature threshold is shown by a dashed line 620, a maximum lambda split value is shown by a dashed line 624, and MBT spark timing is shown by a dashed line 628. Note that while MBT spark timing is shown as a flat line, an absolute spark timing of MBT may vary based on engine operating conditions, such as engine speed and load, for example.

For all of the above, the horizontal axis represents time, with time increasing along the horizontal axis from left to right. The vertical axis represents each labeled parameter. For plots 602, 604, 608, 610, 612, 614, and 616, a magnitude of the parameter increases up the vertical axis from bottom to top. For plot 606, the vertical axis shows whether the engine is operating in a stoichiometric mode ("stoich") or a split lambda torque reduction mode ("split lambda"), as labeled. Further, spark timings for two cylinder sets are shown, corresponding to an engine having an even number of cylinders (e.g., as in engine system 200 of FIG. 2 and engine system 300 of FIG. 3). That is, all of the engine cylinders are divided evenly between the first set and the second set. Further still, the example timeline of FIG. 6 shows operation of an engine with four or more cylinders, although in other examples, similar adjustments may be applied in an engine having two cylinders.

Prior to time t1, the engine is operated in the stoichiometric mode (plot 606), with a lambda split of zero (plot 608) and a spark timing at or near MBT for both the first set of cylinders (dashed plot 616, which overlaps with solid plot 618) and the second set of cylinders (plot 618). Shortly before time t1, a driver tip-out occurs, resulting in a rapid decrease in the pedal position (plot 602). Further, the exhaust gas temperature (plot 604) is between the upper threshold temperature (dashed line 620) and the lower threshold temperature (dashed line 622). The lower threshold temperature (dashed line 622) defines a temperature above which the split lambda torque reduction mode is employed for fast torque reductions rather than spark retard alone in order to avoid exhaust temperature increases that may result in degradation of exhaust components, including a turbocharger turbine and an emission control device. The upper threshold temperature (dashed line 620) corresponds to a temperature above which heat-related degradation of the exhaust components may occur.

Therefore, at time t1, responsive to the engine torque reduction request (plot 602) and with the exhaust temperature (plot 604) greater than the lower threshold temperature (dashed line 622), the engine is transitioned into the split lambda torque reduction mode (plot 606) in order to provide fast torque reductions while maintaining the exhaust gas temperature below the upper threshold temperature (dashed line 620). To transition the engine into the split lambda torque reduction mode, the lambda split is gradually increased between time t1 and time t2 while still maintaining global stoichiometric operation until a maximum lambda split value (dashed line 624) is reached. That is, a degree of enrichment of the first set of cylinders is increased cycle-to-cycle at a same rate as a degree of enleanment of the second set of cylinders, thereby increasing the lambda split between the first set of cylinders and the second set of cylinders each cycle. As demonstrated by dashed plots 612 and 614, split lambda operation increases a torque produced by the rich cylinders (e.g., the first cylinder set) while decreasing a torque produced by the lean cylinders (e.g., the second cylinder set). However, due to the nonlinear relationship between lambda and torque, as described with respect to FIG. 4, net engine torque (plot 610) decreases between t1 and t2. This nonlinear relationship is reflected in the shape of short dashed plot 612 (e.g., engine torque produced by the enriched cylinder set) and long dashed plot 614 (e.g., engine torque produced by the enleaned cylinder set). Specifically, the engine torque produced by the enriched set of cylinders (plot 612) increases between t1 and t2, but this increase is smaller in magnitude than the corresponding decrease in engine torque produced by the enleaned set of cylinders (plot 614) between t1 and t2. As a result, engine torque (plot 610) decreases. Further, between t1 and t2, all of the engine cylinders continue to operate at MBT, such that the relative spark advance for two sets of cylinders (dashed plot 616 and solid plot 618) remains constant. Additionally, the exhaust gas temperature (plot 604) begins to decrease, for example, due to cooling effects of unburnt fuel from the first cylinder. However, the exhaust gas temperature remains above the lower threshold temperature (dashed line 622).

At time t2, the lambda split (plot 608) reaches the maximum lambda split value (dashed line 624). In response, the spark timing of the first, rich set of cylinders is retarded from MBT timing (dashed plot 616) while the spark timing of the second, lean set of cylinders remains at or around MBT (plot 618). As discussed above, operating the enriched set of cylinders with spark retarded relative to MBT decreases the amount of torque produced by the enriched set of cylinders (short dashed plot 614) toward the amount of torque produced by the enleaned set of cylinders (long dashed plot 612). Thus, operating the first, rich set of cylinders with spark retard as shown leads to further net engine torque reductions between t2 and t3. Further, the cooling effects of the split lambda fueling counteracts exhaust temperature increases that would otherwise occur due to retarded spark timing.

At time t3, the torque produced by the enriched set of cylinders (short dashed plot 612) reaches the torque produced by the enleaned set of cylinders (long dashed plot 614). Thus, torque output is balanced between the first cylinder set and the second cylinder set. To further reduce the engine torque according to the reduced torque demand (as determined based on the pedal position shown in plot 602), the spark timing of both the first cylinder set and the lean cylinder set is further retarded from MBT spark timing (e.g., an amount of spark retard is increased) between time t3 and time t4, thus further decreasing the engine torque output (plot 610), while maintaining the exhaust temperature (plot 604) below the upper threshold temperature (dashed line 620).

At time t4, the engine torque (plot 610) reaches the reduced torque demand, and thus, the spark timing of the first cylinder set (dashed plot 616) and the second cylinder set (plot 618). The engine may be considered to have completed a transition into split lambda torque reduction mode (plot 606) and continues to operate in the split lambda torque reduction mode between time t4 and t5 to maintain the engine torque output at the desired reduced torque.

Just before time t5, there is rapid increase in pedal position (plot 602) due to a driver tip-in. In response to the increased engine torque demand and because the torque reduction is no longer indicated, at t5, the system begins to transition out of the split lambda torque reduction mode. Although in this example a change in pedal position triggered the end of split lambda torque reduction mode, in another example, a gear shift event, a traction control demand, etc. may trigger the transition out of split lambda torque reduction mode.

Between time t5 and time t6, spark retard is reduced for both the first, rich set of cylinders (dashed plot 616) and the second, lean set of cylinders (plot 618) until the second, lean cylinder set is operating at nominal (e.g., MBT) spark timing. As shown, the spark timing is advanced toward MBT timing at a different rate for the rich cylinder set than the lean cylinder set in order to maintain torque output balanced between the rich cylinder set and the lean cylinder set. In response to the spark timing of the lean cylinder set reaching nominal spark timing at time t6, the lambda split is decreased until the cylinders are returned to stoichiometric operation at time t7. Further, spark retard continues to be decreased for the first, rich set of cylinders between time t6 and time t7 (dashed plot 616) as the lambda split decreases while the torque output between the first cylinder set and the second cylinder set remains balanced. As the lambda split decreases and as the degree of spark retard decreases, the engine torque increases (plot 610).

At time t7, the lambda split reaches zero (plot 608) and the spark timing of the first cylinder set reaches MBT spark timing (dashed plot 616). Thus, the transition from the split lambda torque reduction mode to the stoichiometric mode is considered complete (plot 606). Further, the engine torque reaches the increased demanded torque. Note that the example timeline 600 depicts a transition from the split lambda torque reduction mode back into nominal spark timing and stoichiometric fueling. However, the engine may transition out of split lambda torque reduction mode into any other mode of operation without departing from the scope of this disclosure. As an example, an engine may transition out of split lambda torque reduction mode into another form of torque reduction, such as spark retard without split lambda fueling.

Just before time t8, another driver tip-out occurs, as shown by the decrease in the pedal position (plot 602). Further, the exhaust temperature (plot 604) is less than the lower threshold temperature (dashed line 622). In response to the decreased torque demand and further in response to the exhaust temperature being less than the lower threshold temperature, at time t8, the spark timing of both the first set of cylinders (dashed plot 616, which overlaps with solid plot 618) and the second set of cylinders (solid plot 618) is globally retarded to the same degree while stoichiometry is maintained and the lambda split remains at zero (plot 608). As a result of the spark retard, the engine torque decreases (plot 610). As a result of the spark retard in the absence of split lambda fueling, the exhaust temperature increases (plot 604).

In this way, fast engine torque reduction may be achieved without increasing vehicle emissions and without increasing exhaust temperatures. For example, engine torque may be decreased through partial engine enleanment while a stoichiometric AFR is maintained at a catalyst for increased catalyst efficiency. As another example, additional torque reduction may be achieved via spark retard, while operating with split lambda fueling offsets exhaust temperature increases due to the spark retard to keep exhaust temperatures below a degradation threshold. As a result, heat-related degradation of exhaust components, including the catalyst and a turbocharger turbine, for example, may be decreased compared with spark retard alone (e.g., without split lambda fueling).

The technical effect of partially enriching an engine while maintaining the engine at global stoichiometry and differentially retarding spark timing in rich operating cylinders and lean operating cylinders is that engine torque may be decreased with reduced exhaust gas temperature increases and with decreased vehicle emissions. As one example, a method, comprises: responsive to a torque reduction request while an exhaust temperature is greater than a threshold, operating an engine with a first number of cylinders enriched and a second number of cylinders enleaned, exhaust gas from both the first number and the second number producing a stoichiometric air-fuel ratio at a downstream catalyst, and adjusting spark timing in the first number of cylinders before adjusting spark timing in the second number of cylinders. In the preceding example, additionally or optionally, the first number of cylinders includes a same number of cylinders as the second number of cylinders, and operating the engine with the first number of cylinders enriched and the second number of cylinders enleaned includes: determining a maximum air-fuel ratio difference for operating the first number of cylinders enriched and the second number of cylinders enleaned; and enriching the first number of cylinders and enleaning the second number of cylinders over one or more engine cycles until the maximum air-fuel ratio difference is reached, the stoichiometric air-fuel ratio maintained at the downstream catalyst each of the one or more engine cycles. In one or both of the preceding examples, additionally or optionally, adjusting the spark timing in the first number of cylinders before adjusting spark timing in the second number of cylinders includes, responsive to reaching the maximum air-fuel ratio difference, retarding a first spark timing in the first number of cylinders while maintaining a second spark timing in the second number of cylinders until a balanced torque output between the first number of cylinders and the second number of cylinders is achieved. In any or all of the preceding examples, additionally or optionally, adjusting the spark timing in the first number of cylinders before adjusting spark timing in the second number of cylinders further includes, responsive to the balanced torque output, further retarding the first spark timing while also retarding the second spark timing to a lesser degree and maintaining the balanced torque output until the torque reduction request is met. In any or all of the preceding examples, additionally or optionally, the first number of cylinders includes a first half of a total number of cylinders in the engine and the second number of cylinders includes a second half of the total number of cylinders in the engine. In any or all of the preceding examples, additionally or optionally, the torque reduction request includes one of a driver tip-out event and a transmission gear shift event. In any or all of the preceding examples, additionally or optionally, the exhaust temperature is a temperature of the downstream catalyst, and the exhaust gas temperature threshold is a threshold temperature of the downstream catalyst. In any or all of the preceding examples, additionally or optionally, the exhaust temperature is a temperature of a turbine positioned upstream of the downstream catalyst, and the threshold temperature is a threshold temperature of the turbine. In any or all of the preceding examples, additionally or optionally, operating the engine with the first number of cylinders enriched and the second number of cylinders enleaned produces a lower torque output than operating the first number of cylinders and the second number of cylinders at stoichiometry.

As another example, a method, comprises: reducing engine torque over a plurality of engine cycles by increasing a difference between a rich air-fuel ratio (AFR) of a first set of engine cylinders and a lean AFR of a second set of engine cylinders and adjusting a first spark timing in the first set of cylinders prior to adjusting a second spark timing in the second set of cylinders, exhaust gas from the first set and the second set producing a stoichiometric mixture and remaining below a temperature threshold each engine cycle. In the preceding example, additionally or optionally, increasing the difference between the rich AFR of the first set of engine cylinders and the lean AFR of the second set of engine cylinders occurs over a first portion of the plurality of engine cycles until a maximum difference is reached. In one or both of the preceding examples, additionally or optionally, the maximum difference is determined based on engine speed and load. In any or all of the preceding examples, additionally or optionally, adjusting the first spark timing in the first set of cylinders prior to adjusting the second spark timing in the second set of cylinders occurs during a second, remaining portion of the plurality of engine cycles. In any or all of the preceding examples, additionally or optionally, adjusting the first spark timing in the first set of cylinders prior to adjusting the second spark timing includes retarding the first spark timing in the first set of cylinders without adjusting the second spark timing in the second set of cylinders until a first torque output of the first set of cylinders is equal to a second torque output of the second set of cylinders, and then further retarding the first spark timing while also retarding the second spark timing while maintaining the first torque output equal to the second torque output. In any or all of the preceding examples, additionally or optionally, the threshold temperature is one of a threshold temperature of an emission control device and a threshold temperature of a turbocharger turbine.

As another example, a system, comprises: a spark ignition engine including a plurality of cylinders; and a controller with computer readable instructions stored in non-transitory memory that, when executed during engine operation, cause the controller to: during a first condition, reduce engine torque by retarding spark timing by a same amount in every cylinder of the plurality of cylinders; and during a second condition, reduce engine torque by operating a first set of the plurality of cylinders at a rich air-fuel ratio and a second set of the plurality of cylinders at a lean air-fuel ratio while retarding spark timing differently in the first set and the second set. In the preceding example, the system additionally or optionally further comprises an emission control device coupled in an exhaust passage, and wherein operating the first set of the plurality of cylinders at the rich air-fuel ratio and the second set of the plurality of cylinders at the lean air-fuel ratio produces a stoichiometric air-fuel ratio at the emission control device. In one or both of the preceding examples, the system additionally or optionally further comprises a turbocharger, including a turbine coupled in the exhaust passage upstream of the emission control device, and wherein the first condition includes a temperature of both the emission control device and a inlet of the turbine being less than a threshold and the second condition includes the temperature of at least one of the emission control device and the inlet of the turbine exceeding the threshold. In any or all of the preceding examples, the system additionally or optionally further comprises a first exhaust manifold coupled to the first set of the plurality of cylinders and a second exhaust manifold coupled to the second set of the plurality of cylinders, the first exhaust manifold separate from the second exhaust manifold upstream of the inlet of the turbine. In any or all of the preceding examples, additionally or optionally, the instructions that cause the controller to reduce engine torque by operating the first set of the plurality of cylinders at the rich air-fuel ratio and the second set of the plurality of cylinders at the lean air-fuel ratio while adjusting spark timing differently in the first set and the second set include further instructions stored in non-transitory memory that, when executed, cause the controller to: determine a maximum difference between the rich air-fuel ratio and the lean air-fuel ratio based on engine speed and load; increase the difference between the rich air-fuel ratio and the lean air-fuel ratio cycle-by-cycle until the maximum difference is reached; responsive to the difference between the rich air-fuel ratio and the lean air-fuel ratio reaching the maximum difference, retard the spark timing in the first set of the plurality of cylinders only until a balanced torque output between the first set of the plurality of cylinders and the second set of the plurality of cylinders is achieved; and responsive to achieving the balanced torque output, further retard the spark timing in the first set of the plurality of cylinders while also retarding the spark timing in the second set of the plurality of cylinders at different rate to maintain the balanced torque output until a desired reduced engine torque is met.

In another representation, a method comprises: selecting between reducing engine torque via spark retard while operating every engine cylinder at stoichiometry and reducing engine torque via split lambda fueling based on an exhaust temperature. In the preceding example, additionally or optionally, selecting between reducing engine torque via spark retard while operating every engine cylinder at stoichiometry and reducing engine torque via split lambda fueling based on the exhaust temperature includes: selecting reducing engine torque via spark retard while operating every engine cylinder at stoichiometry responsive to the exhaust temperature being less than a threshold; and selecting reducing engine torque via split lambda fueling responsive to the exhaust temperature being greater than the threshold. In any or all of the preceding examples, additionally or optionally, reducing engine torque via split lambda fueling includes operating a first half of the engine cylinders at a first, rich air-fuel ratio (AFR) and operating a second half of the engine cylinders at a second, lean AFR, the first AFR and the second AFR averaging stoichiometry. In any or all of the preceding examples, additionally or optionally, reducing engine torque via split lambda fueling further includes increasing a difference between the first AFR and the second AFR until a maximum difference is reached. In any or all of the preceding examples, additionally or optionally, reducing engine torque via split lambda fueling further includes, responsive to reaching the maximum difference, retarding a first spark timing in the first half of the engine cylinders while maintaining a second spark timing in the second half of the engine cylinders until a first torque output of the first half of the engine cylinders is equal to a second torque output of the second half of the engine cylinders. In any or all of the preceding examples, additionally or optionally, reducing engine torque via split lambda fueling further includes, responsive to the first torque output equaling the second output, further retarding the first spark timing in the first half of the engine cylinders while also retarding the second spark timing of the second half of the engine cylinders, the first spark timing further retarded than the second spark timing, while maintaining the first torque output equal to the second torque output.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
responsive to a torque reduction request while an exhaust temperature is greater than a threshold, operating an engine with a first number of cylinders enriched and a second number of cylinders enleaned, exhaust gas from both the first number and the second number producing a stoichiometric air-fuel ratio at a downstream catalyst, and adjusting spark timing in the first number of cylinders before adjusting spark timing in the second number of cylinders.

2. The method of claim 1, wherein the first number of cylinders includes a same number of cylinders as the second number of cylinders, and operating the engine with the first number of cylinders enriched and the second number of cylinders enleaned includes:
determining a maximum air-fuel ratio difference for operating the first number of cylinders enriched and the second number of cylinders enleaned; and
enriching the first number of cylinders and enleaning the second number of cylinders over one or more engine cycles until the maximum air-fuel ratio difference is reached, the stoichiometric air-fuel ratio maintained at the downstream catalyst each of the one or more engine cycles.

3. The method of claim 2, wherein adjusting the spark timing in the first number of cylinders before adjusting spark timing in the second number of cylinders includes, responsive to reaching the maximum air-fuel ratio difference, retarding a first spark timing in the first number of cylinders while maintaining a second spark timing in the second number of cylinders until a balanced torque output between the first number of cylinders and the second number of cylinders is achieved.

4. The method of claim 3, wherein adjusting the spark timing in the first number of cylinders before adjusting spark timing in the second number of cylinders further includes, responsive to the balanced torque output, further retarding the first spark timing while also retarding the second spark timing to a lesser degree and maintaining the balanced torque output until the torque reduction request is met.

5. The method of claim 1, wherein the first number of cylinders includes a first half of a total number of cylinders in the engine and the second number of cylinders includes a second half of the total number of cylinders in the engine.

6. The method of claim 1, wherein the torque reduction request includes one of a driver tip-out event and a transmission gear shift event.

7. The method of claim 1, wherein the exhaust temperature is a temperature of the downstream catalyst, and the exhaust gas temperature threshold is a threshold temperature of the downstream catalyst.

8. The method of claim 1, wherein the exhaust temperature is a temperature of a turbine positioned upstream of the downstream catalyst, and the threshold temperature is a threshold temperature of the turbine.

9. The method of claim 1, wherein operating the engine with the first number of cylinders enriched and the second number of cylinders enleaned produces a lower torque output than operating the first number of cylinders and the second number of cylinders at stoichiometry.

10. A method, comprising:
reducing engine torque over a plurality of engine cycles by increasing a difference between a rich air-fuel ratio (AFR) of a first set of engine cylinders and a lean AFR of a second set of engine cylinders and adjusting a first spark timing in the first set of cylinders prior to adjusting a second spark timing in the second set of cylinders, exhaust gas from the first set and the second set producing a stoichiometric mixture and remaining below a temperature threshold each engine cycle.

11. The method of claim 10, wherein increasing the difference between the rich AFR of the first set of engine cylinders and the lean AFR of the second set of engine cylinders occurs over a first portion of the plurality of engine cycles until a maximum difference is reached.

12. The method of claim 11, wherein the maximum difference is determined based on engine speed and load.

13. The method of claim 11, wherein adjusting the first spark timing in the first set of cylinders prior to adjusting the second spark timing in the second set of cylinders occurs during a second, remaining portion of the plurality of engine cycles.

14. The method of claim 10, wherein adjusting the first spark timing in the first set of cylinders prior to adjusting the second spark timing includes retarding the first spark timing in the first set of cylinders without adjusting the second spark timing in the second set of cylinders until a first torque output of the first set of cylinders is equal to a second torque output of the second set of cylinders, and then further retarding the first spark timing while also retarding the second spark timing while maintaining the first torque output equal to the second torque output.

15. The method of claim 10, wherein the threshold temperature is one of a threshold temperature of an emission control device and a threshold temperature of a turbocharger turbine.

16. A system, comprising:
a spark ignition engine including a plurality of cylinders; and
a controller with computer readable instructions stored in non-transitory memory that, when executed during engine operation, cause the controller to:
during a first condition, reduce engine torque by retarding spark timing by a same amount in every cylinder of the plurality of cylinders; and
during a second condition, reduce engine torque by operating a first set of the plurality of cylinders at a rich air-fuel ratio and a second set of the plurality of cylinders at a lean air-fuel ratio while retarding spark timing differently in the first set and the second set.

17. The system of claim 16, further comprising an emission control device coupled in an exhaust passage, and wherein operating the first set of the plurality of cylinders at the rich air-fuel ratio and the second set of the plurality of cylinders at the lean air-fuel ratio produces a stoichiometric air-fuel ratio at the emission control device.

18. The system of claim 17, further comprising a turbocharger, including a turbine coupled in the exhaust passage upstream of the emission control device, and wherein the first condition includes a temperature of both the emission control device and an inlet of the turbine being less than a threshold and the second condition includes the temperature of at least one of the emission control device and the inlet of the turbine exceeding the threshold.

19. The system of claim 18, further comprising a first exhaust manifold coupled to the first set of the plurality of cylinders and a second exhaust manifold coupled to the second set of the plurality of cylinders, the first exhaust manifold separate from the second exhaust manifold upstream of the inlet of the turbine.

20. The system of claim 16, wherein the instructions that cause the controller to reduce engine torque by operating the first set of the plurality of cylinders at the rich air-fuel ratio and the second set of the plurality of cylinders at the lean air-fuel ratio while adjusting spark timing differently in the first set and the second set include further instructions stored in non-transitory memory that, when executed, cause the controller to:
determine a maximum difference between the rich air-fuel ratio and the lean air-fuel ratio based on engine speed and load;
increase the difference between the rich air-fuel ratio and the lean air-fuel ratio cycle-by-cycle until the maximum difference is reached;
responsive to the difference between the rich air-fuel ratio and the lean air-fuel ratio reaching the maximum difference, retard the spark timing in the first set of the plurality of cylinders only until a balanced torque output between the first set of the plurality of cylinders and the second set of the plurality of cylinders is achieved; and
responsive to achieving the balanced torque output, further retard the spark timing in the first set of the plurality of cylinders while also retarding the spark timing in the second set of the plurality of cylinders at different rate to maintain the balanced torque output until a desired reduced engine torque is met.

* * * * *